(12) United States Patent
Okada et al.

(10) Patent No.: US 12,092,542 B2
(45) Date of Patent: Sep. 17, 2024

(54) TORQUE SENSOR

(71) Applicant: TRI-FORCE MANAGEMENT CORPORATION, Saitama-ken (JP)

(72) Inventors: Kazuhiro Okada, Saitama-ken (JP); Miho Sekine, Saitama-ken (JP)

(73) Assignee: TRI-FORCE MANAGEMENT CORPORATION, Saitama-Ken (JP)

( * ) Notice: Subject to any disclaimer, the term of this patent is extended or adjusted under 35 U.S.C. 154(b) by 389 days.

(21) Appl. No.: 17/619,496

(22) PCT Filed: Feb. 18, 2021

(86) PCT No.: PCT/JP2021/006090
§ 371 (c)(1),
(2) Date: Dec. 15, 2021

(87) PCT Pub. No.: WO2022/176097
PCT Pub. Date: Aug. 25, 2022

(65) Prior Publication Data
US 2023/0152172 A1 May 18, 2023

(51) Int. Cl.
*G01L 5/165* (2020.01)
*G01L 3/14* (2006.01)
*G01L 5/00* (2006.01)

(52) U.S. Cl.
CPC ............ *G01L 5/165* (2013.01); *G01L 3/1428* (2013.01); *G01L 3/1442* (2013.01); *G01L 5/0076* (2013.01)

(58) Field of Classification Search
CPC ..... G01L 5/165; G01L 5/0076; G01L 3/1428; G01L 3/1442
See application file for complete search history.

(56) References Cited

U.S. PATENT DOCUMENTS

2018/0017452 A1* 1/2018 Okada ................. G01L 3/106
2018/0209860 A1 7/2018 Okada
2019/0310142 A1 10/2019 Kim

FOREIGN PATENT DOCUMENTS

JP 2018-132442 A 8/2018
JP 2019-179039 A 10/2019
(Continued)

OTHER PUBLICATIONS

International Search Report dated Mar. 23, 2021 for Application No. PCT/JP2021/006090.
(Continued)

*Primary Examiner* — Paul M. West
(74) *Attorney, Agent, or Firm* — LADAS & PARRY LLP

(57) ABSTRACT

A torque sensor according to the present invention includes a strain body, first structure Y-axis connecting portions, second structure X-axis connecting portions and a detection element. The first structure Y-axis connecting portions are disposed on a positive side and a negative side of a Y-axis relative to the strain body, and the second structure X-axis connecting portions are disposed on a positive side and a negative side of an X-axis relative to the second structure. The strain body includes four deformable bodies each including a displacement portion that is displaced in a Z-axis direction by elastic deformation. The deformable bodies are respectively disposed in a first quadrant, a second quadrant, a third quadrant, and a fourth quadrant. The detection element includes a capacitive element that detects a change in capacitance value by a displacement of the displacement portion of each of the deformable bodies in the Z-axis direction.

10 Claims, 23 Drawing Sheets

(56) References Cited

FOREIGN PATENT DOCUMENTS

JP        2019-207120 A    12/2019
WO        2013014803 A1    1/2013

OTHER PUBLICATIONS

Espacenet English abstract of JP 2019-207120 A.
Extended European Search Report issued on Aug. 31, 2022 for Application No. EP 21819314.

* cited by examiner

TORQUE SENSOR

RELATED APPLICATION

This application is an application under 35 U.S.C. 371 of International Application No. PCT/JP2021/006090 filed on Feb. 18, 2021, the entire contents of which are incorporated herein by reference.

FIELD

The present invention relates to a torque sensor.

BACKGROUND

Heretofore, there has been known a torque sensor that outputs, as an electric signal, moment (torque) acting about a predetermined rotation axis (e.g., see Patent Literature 1). This torque sensor is widely utilized for torque control of various robots including industrial robots, such as collaborative robots, life support robots, medical robots, and service robots. Thus a high-precision, high-sensitivity, and low-price torque sensor is required.

For example, a general torque sensor includes a circular ring-shaped force receiving body, a circular ring-shaped strain body, and a circular ring-shaped support body. The strain body is disposed inside the force receiving body, and the support body is disposed inside the strain body. The force receiving body, the strain body, and the support body are disposed on an XY plane, and the strain body is connected to each of the force receiving body and the support body. When moment about a Z-axis acts on the force receiving body, the strain body is elastically deformed radially. This elastic deformation of the strain body is detected by an electrostatic capacitive element having a fixed electrode and a displacement electrode. The displacement electrode is mounted on the outer peripheral surface of the strain body, and the fixed electrode is mounted on the inner peripheral surface of the force receiving body so as to face the displacement electrode. The fixed electrode may be mounted on the outer peripheral surface of the support body, in which case the displacement electrode is mounted on the inner peripheral surface of the strain body.

In the torque sensor having such a configuration, the displacement electrode and the fixed electrode are disposed so that the facing surfaces are perpendicular to the XY plane. In this case, the alignment of the displacement electrode and the fixed electrode becomes difficult, and the efficiency of manufacturing the torque sensor can deteriorate.
Patent Literature WO 2013/04803 A1

SUMMARY

The present invention has been made in view of such points, and is directed to provide a torque sensor for which the efficiency of manufacture is improved.

The present invention provides a torque sensor that detects moment about a Z-axis in an XYZ three-dimensional coordinate system, including:
a first structure formed around the Z-axis;
a second structure formed around the Z-axis;
a strain body provided between the first structure and the second structure, the strain body connecting the first structure and the second structure, and producing elastic deformation by the action of the moment;
two first structure Y-axis connecting portions that connect the first structure and the strain body;
two second structure X-axis connecting portions that connect the strain body and the second structure;
a detection element; and
a detection circuit that outputs an electric signal indicating the moment, based on a detection result of the detection element, wherein
the first structure Y-axis connecting portions are disposed on a positive side and a negative side of a Y-axis relative to the strain body,
the second structure X-axis connecting portions are disposed on a positive side and a negative side of an X-axis relative to the second structure,
the strain body includes four deformable bodies each including a displacement portion that is displaced in a Z-axis direction by elastic deformation,
the deformable bodies are respectively disposed in a first quadrant, a second quadrant, a third quadrant, and a fourth quadrant, and
the detection element includes a capacitive element that detects a change in capacitance value by a displacement of the displacement portion of each of the deformable bodies in the Z-axis direction.

In addition, in the torque sensor described above,
the second structure may be disposed inside the first structure when seen along the Z-axis.

Further, in the torque sensor described above,
the first structure Y-axis connecting portion may extend along the Y-axis and the Z-axis,
the dimension of the first structure Y-axis connecting portion in the Z-axis direction may be greater than the dimension of the first structure Y-axis connecting portion in the Y-axis direction,
the second structure X-axis connecting portion may extend along the X-axis and the Z-axis, and
the dimension of the second structure X-axis connecting portion in the Z-axis direction may be greater than the dimension of the second structure X-axis connecting portion in the X-axis direction.

Further, the torque sensor described above may further include:
two first structure X-axis connecting portions that connect the first structure and the second structure; and
two second structure Y-axis connecting portions that connect the strain body and the second structure, wherein
when seen along the Z-axis, the first structure X-axis connecting portions may be disposed on a positive side and a negative side of the X-axis relative to the strain body, and the second structure Y-axis connecting portions may be disposed on a positive side and a negative side of the Y-axis relative to the second structure,
the first structure X-axis connecting portion may extend along the X-axis, and
the second structure Y-axis connecting portion may extend along the Y-axis.

Further, in the torque sensor described above,
the first structure X-axis connecting portion and the second structure Y-axis connecting portion may extend along the Z-axis,
the dimension of the first structure X-axis connecting portion in the Z-axis direction may be greater than the dimension of the first structure X-axis connecting portion in the X-axis direction, and
the dimension of the second structure Y-axis connecting portion in the Z-axis direction may be greater than the dimension of the second structure Y-axis connecting portion in the Y-axis direction.

Further, in the torque sensor described above,
the dimension of the first structure X-axis connecting portion in the Y-axis direction may be smaller than the dimension of the first structure Y-axis connecting portion in the X-axis direction, and
the dimension of the second structure Y-axis connecting portion in the X-axis direction may be smaller than the dimension of the second structure X-axis connecting portion in the Y-axis direction.

Further, in the torque sensor described above,
the strain body may be formed into a circular ring shape when seen along the Z-axis.

Further; in the torque sensor described above, it may be that
the strain body and the second structure are not connected at a position of the strain body where the first structure Y-axis connecting portion is connected, and
the first structure and the strain body are not connected at a position of the strain body where the second structure X-axis connecting portion is connected.

Further, in the torque sensor described above,
the dimension of the first structure X-axis connecting portion in the X-axis direction may be greater than the dimension of the first structure Y-axis connecting portion in the Y-axis direction, and
the dimension of the second structure Y-axis connecting portion in the Y-axis direction may be greater than the dimension of the second structure X-axis connecting portion in the X-axis direction.

Further, in the torque sensor described above,
the strain body may be formed into an elliptical ring shape so as to have a long axis along the Y-axis and a short axis along the X-axis, when seen along the Z-axis.

Further, in the torque sensor described above,
the first structure Y-axis connecting portion may be formed at a connection position between the first structure and the strain body, and
the second structure X-axis connecting portion may be formed at a connection position between the strain body and the second structure.

Further, in the torque sensor described above,
the outer peripheral surface of the strain body may be formed into an elliptical shape so as to have a long axis along the Y-axis and a short axis along the X-axis, when seen along the Z-axis.

Further, in the torque sensor described above,
the outer peripheral surface of the second structure may be formed into an elliptical shape so as to have a long axis along the X-axis and a short axis along the Y-axis, when seen along the Z-axis.

Further, the torque sensor described above may further include:
two first structure X-axis connecting portions that connect the first structure and the strain body; and
two second structure Y-axis connecting portions that connect the strain body and the second structure, wherein
when seen along the Z-axis, the first structure X-axis connecting portions may be disposed on a positive side and a negative side of the X-axis relative to the strain body, and the second structure Y-axis connecting portions may be disposed on a positive side and a negative side of the Y-axis relative to the second structure,
the first structure X-axis connecting portion may extend along the X-axis, and
the second structure Y-axis connecting portion may extend along the Y-axis.

Further, in the torque sensor described above,
the dimension of the first structure X-axis connecting portion in the Y-axis direction may be smaller than the dimension of the first structure Y-axis connecting portion in the X-axis direction, and
the dimension of the second structure Y-axis connecting portion in the X-axis direction may be smaller than the dimension of the second structure X-axis connecting portion in the Y-axis direction.

Further, in the torque sensor described above, it may be that
the strain body and the second structure are not connected at a position of the strain body where the first structure Y-axis connecting portion is connected, and
the first structure and the strain body are not connected at a position of the strain body where the second structure X-axis connecting portion is connected.

Further, in the torque sensor described above,
the second structure may be disposed on a negative side of the Z-axis relative to the strain body.

Further, in the torque sensor described above,
the strain body may be disposed on a negative side of the Z-axis relative to the first structure.

According to the present invention, manufacturing efficiency can be improved.

DETAILED DESCRIPTION

Figure 1:
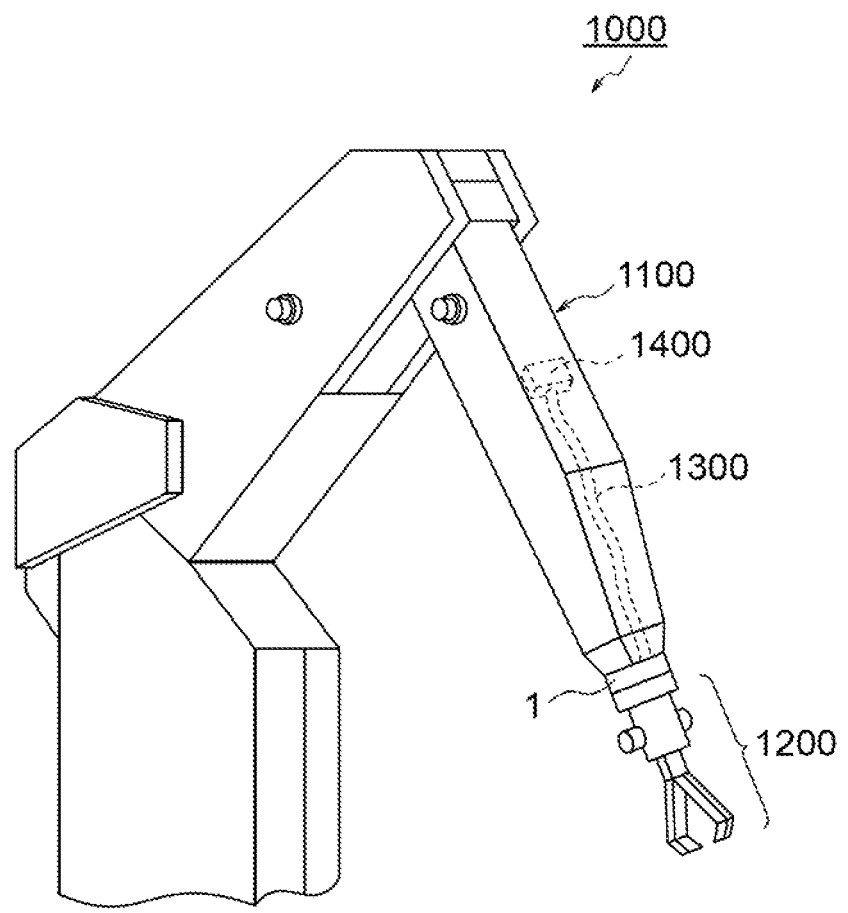
FIG. 1 is a perspective view illustrating one example of a robot to which a torque sensor according to a first embodiment is applied.

Hereinafter, embodiments of the present invention are described with reference to the drawings. In addition, in the drawings accompanying the present specification, scale, a lengthwise and crosswise dimensional ratio, and others are suitably modified and exaggerated from real ones for convenience of illustration and ease of understanding.

In addition, terms such as "parallel", "orthogonal", and "equal" used in the present specification to specify shapes, geometrical conditions, physical properties, and their degrees, dimensions, values of physical properties, and others are not restricted to strict meanings, and are interpreted including the range of such a degree that similar function can be expected.

First Embodiment

First, a torque sensor according to a first embodiment of the present invention is described by use of FIGS. 1 to 14.

Before describing the torque sensor according to the present embodiment, an example of applying the torque sensor to a robot is described with reference to FIG. 1. FIG. 1 is a perspective view illustrating one example of a robot to which the torque sensor according to the present embodiment is applied.

As illustrated in FIG. 1, an industrial robot 1000 includes a robot main body 1100, an end effector 1200, an electric cable 1300, a control unit 1400, and a torque sensor 1. The robot main body 1100 includes an arm portion of the robot. The torque sensor 1 is provided between the robot main body 1100 and the end effector 1200.

The electric cable 1300 extends inside the robot main body 1100. This electric cable 1300 is connected to a connector (not illustrated) of the torque sensor 1.

In addition, the control unit 1400 is disposed inside the robot main body 1100 in FIG. 1, but it may be disposed in another place (e.g., a control board outside the robot). Moreover, an aspect of attaching the torque sensor 1 to the robot is not limited to the one illustrated in FIG. 1.

The torque sensor 1 detects moment acting on the end effector 1200 that functions as a gripper. An electric signal indicating the detected moment is transmitted to the control unit 1400 of the industrial robot 1000 via the electric cable 1300. The control unit 1400 controls the operations of the robot main body 1100 and the end effector 1200, based on the received electric signal. Moreover, a torque sensor may be provided in a non-illustrated joint of the robot main body 1100. In this case, the torque sensor may be disposed parallel to a decelerator coupled to a drive unit for driving a joint.

In addition, the torque sensor 1 is not limited to an industrial robot, and it can be applied to various robots such as a collaborative robot, a life support robot, a medical robot, and a service robot.

Figure 2:
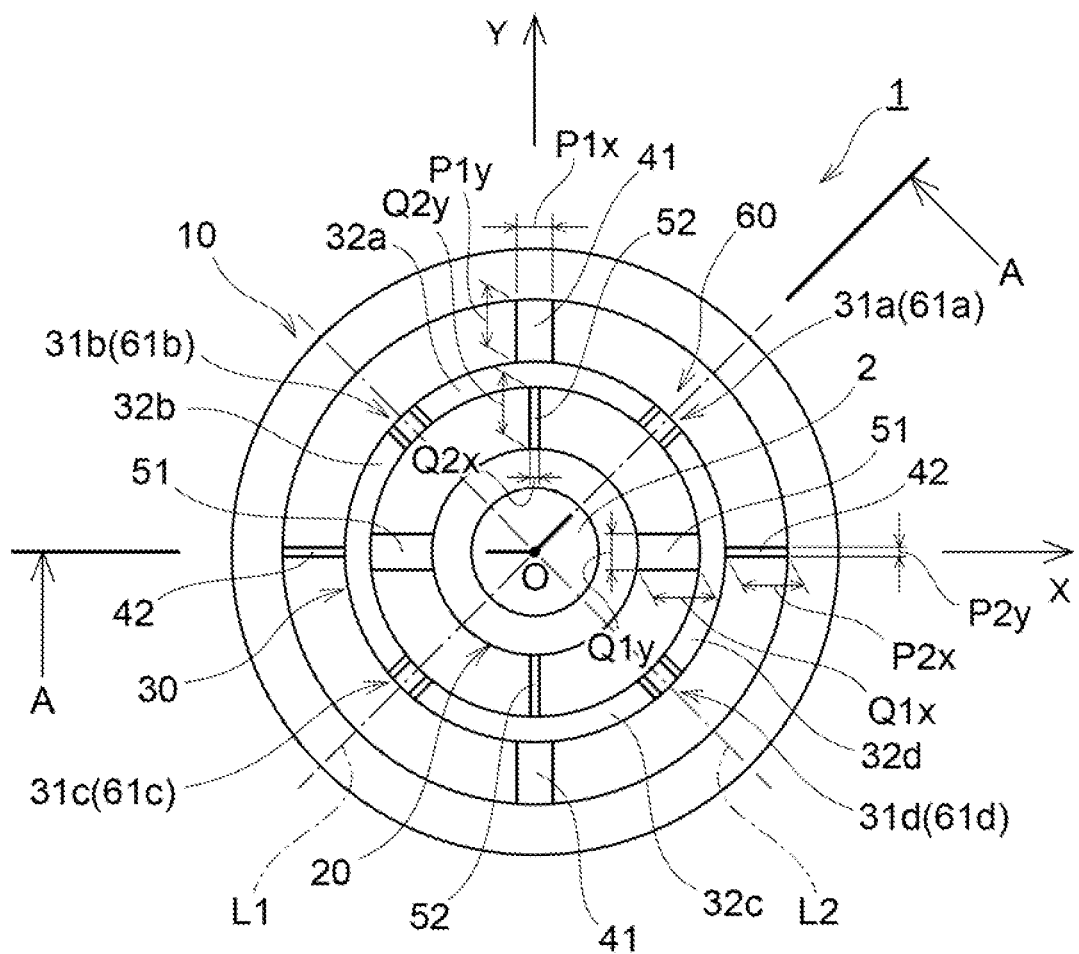
FIG. 2 is a plan view illustrating the torque sensor according to the first embodiment.
Figure 3:
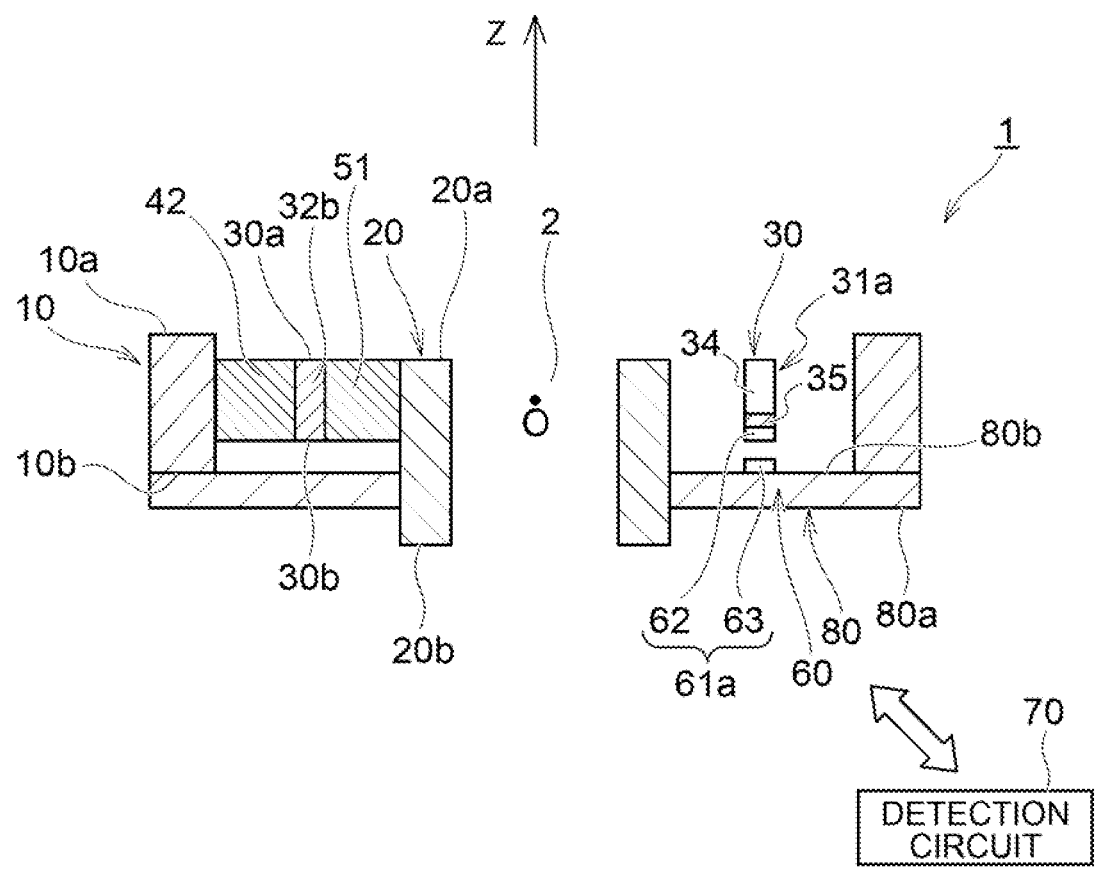
FIG. 3 is a sectional view along the line A-A in FIG. 2.
Figure 4:
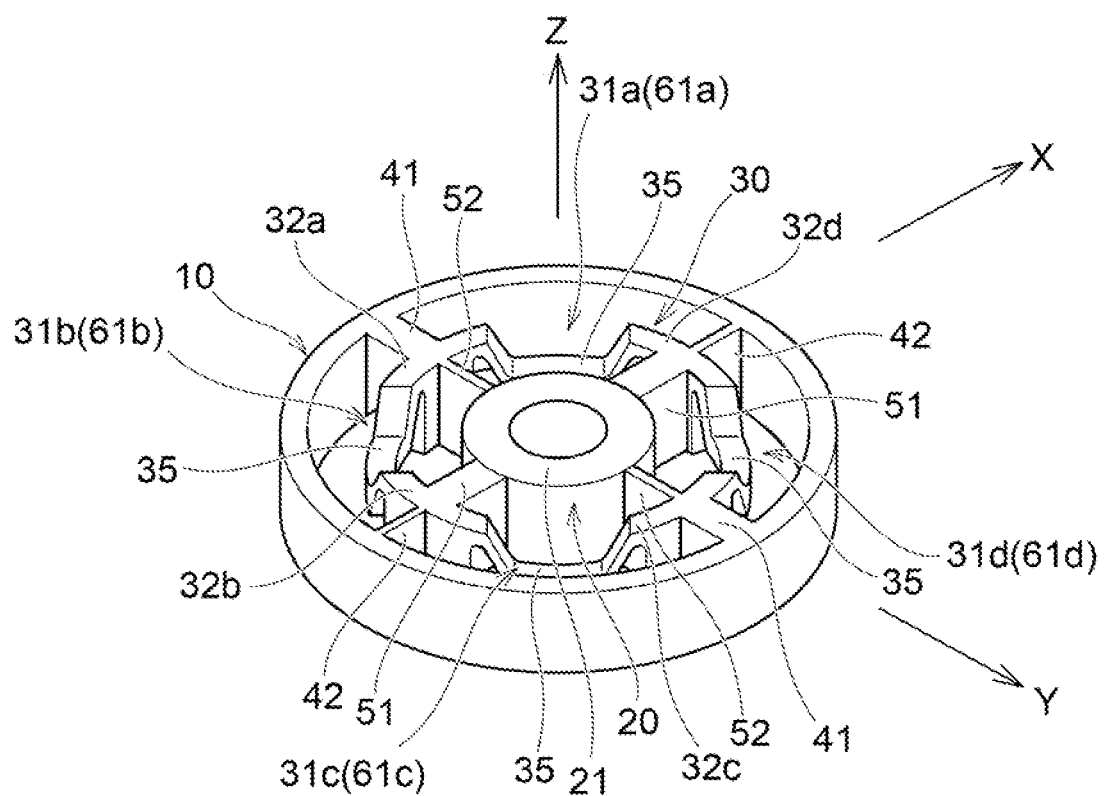
FIG. 4 is a perspective view illustrating the torque sensor in FIG. 2.
Figure 5:
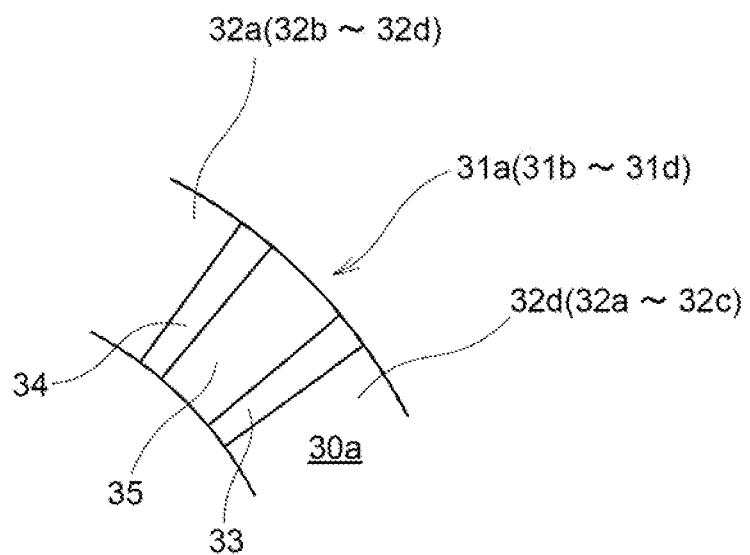
FIG. 5 is an enlarged plan view illustrating a deformable body in FIG. 2.
Figure 6:
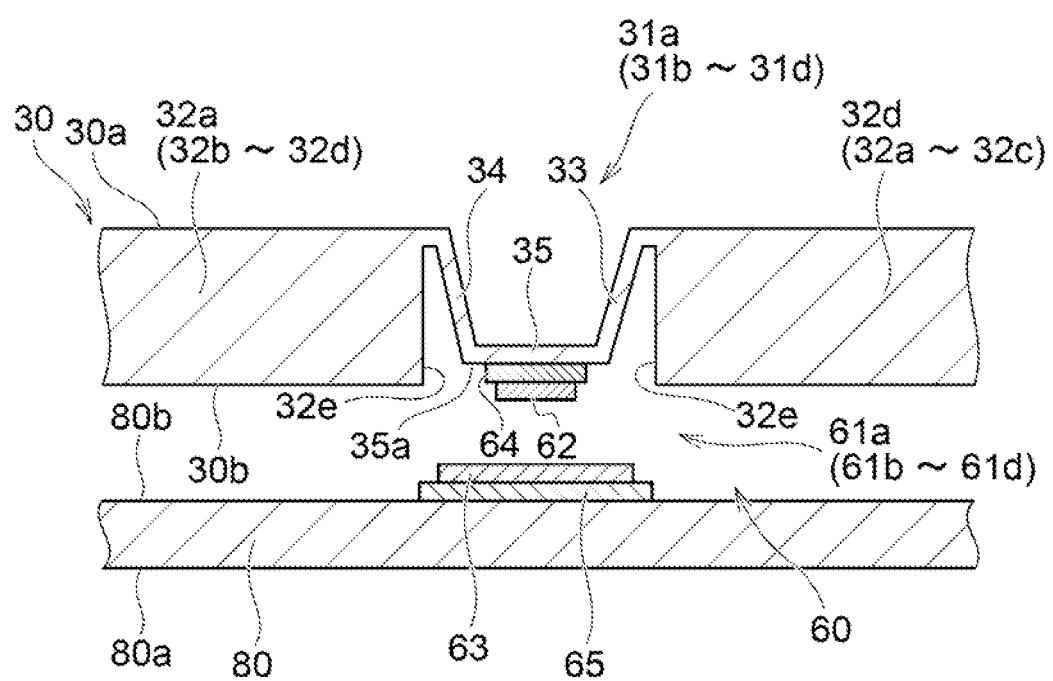
FIG. 6 is a sectional view illustrating the deform deformable body and a capacitive element in FIG. 2.
Figure 7:
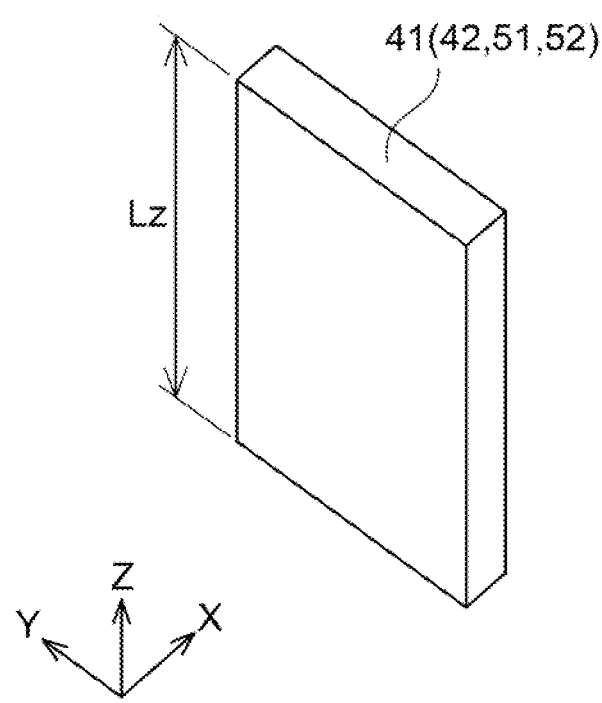
FIG. 7 is perspective view illustrating each connecting portion in FIG. 2.

The torque sensor according to the embodiment of the present invention is described below with reference to FIGS. 2 to 7, FIG. 2 is a plan view illustrating the torque sensor in the first embodiment. FIG. 3 is a sectional view along the line A-A in FIG. 2. FIG. 4 is a perspective view illustrating the torque sensor in FIG. 2. FIG. 5 is an enlarged plan view illustrating a deformable body in FIG. 2. FIG. 6 is a sectional view illustrating the deformable body and a capacitive element in FIG. 2. FIG. 7 is a perspective view illustrating each connecting portion in FIG. 2.

The torque sensor 1 has a function of detecting moment (torque) acting about a predetermined rotation axis, and outputting the detected moment as an electric signal. However, without being limited thereto, the torque sensor 1 may have a function of additionally outputting moment acting about another rotation axis as an electric signal. Moreover, the torque sensor 1 may be configured to additionally output force in a predetermined direction as an electric signal.

In the present embodiment, the torque sensor 1 that detects moment about a Z-axis in an XYZ three-dimensional coordinate system is described. In a state of the description given below, a Z-axis direction is an up-down direction, and the torque sensor 1 is disposed so that a force receiving body 10, a support body 20, and a strain body 30 are disposed on an XY plane. The torque sensor 1 according to the present embodiment is not limited to being used in a posture in which the Z-axis direction is the up-down direction.

As illustrated in FIGS. 2 to 4, the torque sensor 1 includes the force receiving body 10, the support body 20, the strain body 30, a force receiving body Y-axis connecting portion 41, a support body X-axis connecting portion 51, a detection element 60, and a detection circuit 70. Each component is described in more detail below. The force receiving body 10 is one example of a first structure, and the support body 20 is one example of a second structure. The force receiving body Y-axis connecting portion 41 is one example of a first structure Y-axis connecting portion, and the support body X-axis connecting portion 51 is one example of a second structure X-axis connecting portion.

The force receiving body 10 is formed about the Z-axis. The force receiving body 10 may be formed into a flat shape. The force receiving body 10 may be formed into a circular ring shape when seen along the Z-axis.

The force receiving body 10 receives action of moment to be detected. The force receiving body 10 moves relative to the support body 20 by receiving this action. As far as the example of FIG. 1 described above is concerned, the force receiving body 10 is fixed to the end effector 1200, and receives moment from the end effector 1200. As illustrated in FIG. 3, the force receiving body 10 includes a fitting surface 10*a* fixed to the end effector 1200. The fitting surface 10*a* is disposed on a Z-axis positive side of the force receiving body 10, and is equivalent to the upper surface (surface on the Z-axis positive side) of the force receiving body 10. The fitting surface 10*a* may be disposed more on the Z-axis positive side than an upper surface 30*a* of the strain body 30 (strain body connecting portions 32*a* to 32*d* described later) and an upper surface 20*a* of the support body 20. This can prevent interference between the end effector 1200 and the torque sensor 1 when the torque sensor 1 is fixed to the end effector 1200. The upper surface 30*a* of the strain body 30 and the upper surface 20*a* of the support body 20 may be disposed at the same position in the Z-axis direction. The upper surface 30*a* of the strain body 30 and the upper surface of each of connecting portions 41, 42, 51, and 52 described later may be disposed at the same position in the Z-axis direction.

As illustrated in FIGS. 2 and 4, the support body 20 is formed about the Z-axis. The support body 20 may be formed into a flat shape. The support body 20 may be formed into a circular ring shape when seen along the Z-axis. A sensor opening 2 of the torque sensor 1 is formed inside the support body 20. A cable and a tube used in the robot is passed through the sensor opening 2 in some cases. When seen along the Z-axis, the support body 20 is disposed inside the force receiving body 10, and is apart from the force receiving body 10. The support body 20 is disposed on the XY plane together with the force receiving body 10, and may be formed concentrically with the force receiving body 10.

The support body 20 supports the force receiving body 10. As far as the example of FIG. 1 described above is concerned, the support body 20 is fixed to the end of the robot main body 1100 (arm portion), and supported by the robot main body 1100. As illustrated in FIG. 3, the support body 20 includes a fitting surface 20b fixed to the robot main body 1100. The fitting surface 20b is disposed on a Z-axis negative side of the support body 20, and is equivalent to the lower surface (surface on the Z-axis negative side) of the support body 20. The fitting surface 20b may be disposed more on the Z-axis negative side than a lower surface 10b of the force receiving body 10 and a lower surface 30b of the strain body 30 (the strain body connecting portions 32a to 32d described later). Moreover, as will be described later, when an electrode support body 80 described later is provided on the lower surface 10b of the force receiving body 10, the fitting surface 20b may be disposed more on the Z-axis negative side than a lower surface 80a of the electrode support body 80. In this case, this can prevent interference between the robot main body 1100 and the torque sensor 1 when the torque sensor 1 is fixed to the robot main body 1100.

As illustrated in FIGS. 2 to 4, the strain body 30 is provided between the force receiving body 10 and the support body 20. In the present embodiment, the strain body 30 may be formed into a circular ring shape when seen along the Z-axis. When seen along the Z-axis, the strain body 30 is disposed inside the force receiving body 10, and disposed outside the support body 20. The strain body 30 is apart from the force receiving body 10, and apart from the support body 20. The strain body 30 may be formed concentrically with the force receiving body 10, and formed concentrically with the support body 20. The width (radial dimension) of the strain body 30 may be circumferentially constant.

The strain body 30 connects the force receiving body 10 and the support body 20. The force receiving body 10 is supported by the support body 20 via the strain body 30. The strain body 30 is configured to be elastically deformed when the force receiving body 10 receives the action of moment.

As illustrated in FIGS. 2 and 4, the strain body 30 includes four deformable bodies 31a to 31d. Each of the deformable bodies 31a to 31d is configured to cause elastic deformation by the action of moment. The four deformable bodies 31a to 31d include the first deformable body 31a disposed in a first quadrant, the second deformable body 31b disposed in a second quadrant, the third deformable body 31c disposed in a third quadrant, and the fourth deformable body 31d disposed in a fourth quadrant.

The first deformable body 31a and the third deformable body 31c may be disposed on a line L1 passing through the first quadrant and the third quadrant and being at 45° to an X-axis and a Y-axis. Each of later-described deformable portions 33 and 34 of the first deformable body 31a and the third deformable body 31c as well as a displacement portion 35 may be disposed parallel to the line L1. The second deformable body 31b and the fourth deformable body 31d may be disposed on a line L2 passing through the second quadrant and the fourth quadrant and being at 45° to the X-axis and the Y-axis. Each of later-described deformable portions 33 and 34 of the second deformable body 31b and the fourth deformable body 31d as well as the displacement portion 35 may be disposed parallel to the line L2. The first deformable body 31a and the second deformable body 31b may be disposed symmetrically to the fourth deformable body 31d and the third deformable body 31c with respect to the X-axis. The first deformable body 31a and the fourth deformable body 31d may be disposed symmetrically to the second deformable body 31b and the third deformable body 31c with respect to the Y-axis. When seen along the Z-axis, each of the deformable bodies 31a to 31d may be disposed point-symmetrically with respect to an origin O.

The strain body 30 includes the four strain body connecting portions 32a to 32d. Each of the strain body connecting portions 32a to 32d connects the corresponding two deformable bodies 31a to 31d. The four strain body connecting portions 32a to 32d include the first strain body connecting portion 32a, the second strain body connecting portion 32b, the third strain body connecting portion 32c, and the fourth strain body connecting portion 32d. The first strain body connecting portion 32a connects the first deformable body 31a and the second deformable body 31b. The second strain body connecting portion 32b connects the second deformable body 31b and the third deformable body 31c. The third strain body connecting portion 32c connects the third deformable body 31c and the fourth deformable body 31d. The fourth strain body connecting portion 32d connects the fourth deformable body 31d and the first deformable body 31a.

As illustrated in FIGS. 5 and 6, in the present embodiment, each of the deformable bodies 31a to 31d includes the first deformable portion 33, the second deformable portion 34, and the displacement portion 35. The first deformable portion 33 is connected to the corresponding strain body connecting portions 32a to 32d, and the second deformable portion 34 is connected to the corresponding other strain body connecting portions 32a to 32d. The displacement portion 35 is disposed between the first deformable portion 33 and the second deformable portion 34, and the first deformable portion 33 and the second deformable portion 34 are connected to each other via the displacement portion 35.

The first deformable portion 33 and the second deformable portion 34 are formed into a plate shape, and have smaller thicknesses than each of the strain body connecting portions 32a to 32d when radially seen. The first deformable portion 33 and the second deformable portion 34 each have a function as a leaf spring, and are easily elastically deformable. The displacement portion 35 is also formed into a plate shape, and has smaller thickness than each of the strain body connecting portions 32a to 32d. The thickness of the first deformable portion 33, the thickness of the second deformable portion 34, and the thickness of the displacement portion 35 may be equal. Alternatively, the thickness of the displacement portion 35 may be greater than the thickness of the first deformable portion 33 and the thickness of the second deformable portion 34.

The first deformable portion 33 extends downward toward the displacement portion 35 from an upper end of an end face 32e (see FIG. 6) of each of the corresponding strain body connecting portions 32a to 32d. For example, the first deformable portion 33 of the first deformable body 31a extends downward toward the displacement portion 35 from an upper end of the end face 32e of the fourth strain body connecting portion 32d. When radially seen, the first deformable portion 33 is tilted relative to the Z-axis, and extends linearly. The second deformable portion 34 extends downward toward the displacement portion 35 from an upper end of the end face 32e of the corresponding strain body connecting portions 32a to 32d. For example, the second deformable portion 34 of the first deformable body 31a extends downward toward the displacement portion 35 from an upper end of the end face 32e of the first strain body connecting portion 32a. When radially seen, the second deformable portion 34 is tilted relative to the Z-axis, and extends linearly.

The displacement portion 35 is disposed perpendicularly to the Z-axis, i.e., along the XY plane. When radially seen, the displacement portion 35 is formed linearly along the XY plane. As illustrated in FIG. 6, a lower surface 35a of the displacement portion 35 may be disposed at a position more on the Z-axis positive side than the lower surface 30b of each of the strain body connecting portions 32a to 32d (the strain body 30). The displacement portion 35 is configured to be displaced in the Z-axis direction by the elastic deformation of the first deformable portion 33 and the second deformable portion 34.

As illustrated in FIG. 5, the first deformable portion 33, the second deformable portion 34, and the displacement portion 35 are each formed into a curved shape when seen along the Z-axis. More specifically, the first deformable portion 33, the second deformable portion 34, and the displacement portion 35 constitute a part of the circular ring shape of the strain body 30, and are formed into an arc shape. The first deformable portion 33, the second deformable portion 34, and the displacement portion 35 may be formed concentrically with the force receiving body 10 or the support body 20.

As illustrated in FIGS. 2 to 4, the force receiving body Y-axis connecting portion 41 connects the force receiving body 10 and the strain body 30. The force receiving body 10 and the strain body 30 are connected by the two force receiving body Y-axis connecting portions 41. When seen along the Z-axis, the force receiving body Y-axis connecting portions 41 are disposed on the positive side of the Y-axis and the negative side of the Y-axis relative to the strain body 30. In the present embodiment, one of the force receiving body Y-axis connecting portions 41 is disposed at a position on the positive side of the Y-axis relative to the strain body 30. This force receiving body Y-axis connecting portion 41 connects the force receiving body 10 and the first strain body connecting portion 32a. The other one of the force receiving body Y-axis connecting portions 41 is disposed at a position on the negative side of the Y-axis. This force receiving body Y-axis connecting portion 41 connects the force receiving body 10 and the third strain body connecting portion 32c.

The force receiving body Y-axis connecting portion 41 according to the present embodiment is disposed on the Y-axis, and extends along the Y-axis. In the present embodiment, as illustrated in FIG. 7, the force receiving body Y-axis connecting portion 41 is formed into a rectangular shape along the X-axis, the Y-axis, and the Z-axis. The dimension (equivalent to Lz in FIG. 7) of the force receiving body Y-axis connecting portion 41 in the Z-axis direction is greater than the dimension (P1y in FIG. 2) of the force receiving body Y-axis connecting portion 41 in the Y-axis direction.

As illustrated in FIGS. 2 to 4, the support body X-axis connecting portion 51 connects the strain body 30 and the support body 20. The strain body 30 and the support body 20 are connected by the two support body X-axis connecting portions 51. When seen along the Z-axis, the support body X-axis connecting portions 51 are disposed on the positive side of the X-axis and the negative side of the X-axis relative to the support body 20. In the present embodiment, one of the support body X-axis connecting portions 51 is disposed at a position on the positive side of the X-axis. This support body X-axis connecting portion 51 connects the support body 20 and the fourth strain body connecting portion 32d. The other one of the support body X-axis connecting portions 51 is disposed at a position on the negative side of the X-axis. This support body X-axis connecting portion 51 connects the support body 20 and the second strain body connecting portion 32b.

The support body X-axis connecting portion 51 according to the present embodiment is disposed on the X-axis, and extends along the X-axis. In the present embodiment, similar to the force receiving body Y-axis connecting portion 41, the support body X-axis connecting portion 51 is formed into a rectangular shape along the X-axis, the Y-axis, and the Z-axis. The dimension (equivalent to Lz in FIG. 7) of the support body X-axis connecting portion 51 in the Z-axis direction is greater than the dimension (Q1x in FIG. 2) of the support body X-axis connecting portion 51 in the X-axis direction.

As illustrated in FIGS. 2 to 4, the torque sensor 1 according to the present embodiment includes the force receiving body X-axis connecting portion 42 and the support body Y-axis connecting portion 52. The force receiving body X-axis connecting portion 42 is one example of a first structure X-axis connecting portion, and the support body Y-axis connecting portion 52 is one example of a second structure Y-axis connecting portion.

The force receiving body X-axis connecting portion 42 connects the force receiving body 10 and the strain body 30. The force receiving body 10 and the strain body 30 are connected by the two force receiving body X-axis connecting portions 42. When seen along the Z-axis, the force receiving body X-axis connecting portions 42 are disposed on the positive side of the X-axis and the negative side of the X-axis relative to the strain body 30. In the present embodiment, one of the force receiving body X-axis connecting portions 42 is disposed at a position on the positive side of the X-axis relative to the strain body 30. This force receiving body X-axis connecting portion 42 connects the force receiving body 10 and the fourth strain body connecting portion 32d. The other one of the force receiving body X-axis connecting portions 42 is disposed at a position on the negative side of the X-axis. This force receiving body X-axis connecting portion 42 connects the force receiving body 10 and the second strain body connecting portion 32b.

The force receiving body X-axis connecting portion 42 according to the present embodiment is disposed on the X-axis, and extends along the X-axis. In the present embodiment, similar to the force receiving body Y-axis connecting portion 41, the force receiving body X-axis connecting portion 42 is formed into a rectangular shape along the X-axis, the Y-axis, and the Z-axis. The dimension (equivalent to Lz in FIG. 7) of the force receiving body X-axis connecting portion 42 in the Z-axis direction is greater than the dimension (P2x in FIG. 2) of the force receiving body X-axis connecting portion 42 in the X-axis direction.

As illustrated in FIG. 2, in the present embodiment, the dimension (P2y in FIG. 2) of the force receiving body X-axis connecting portion 42 in the Y-axis direction is smaller than the dimension (P1x in FIG. 2) of the force receiving body Y-axis connecting portion 41 in the X-axis direction. In other words, when seen along the Z-axis, the width of the force receiving body X-axis connecting portion 42 is smaller than the width of the force receiving body Y-axis connecting portion 41. In addition, the dimension (P2x) of the force receiving body X-axis connecting portion 42 in the X-axis direction may be equal to the dimension (P1y) of the force receiving body Y-axis connecting portion 41 in the Y-axis direction.

As illustrated in FIGS. 2 to 4, the support body Y-axis connecting portion 52 connects the strain body 30 and the support body 20. The strain body 30 and the support body 20 are connected by the two support body Y-axis connecting portions 52. When seen along the Z-axis, the support body Y-axis connecting portions 52 are disposed on the positive side of the Y-axis and the negative side of the Y-axis relative to the support body 20. In the present embodiment, one of the support body Y-axis connecting portions 52 is disposed at a position on the positive side of the Y-axis relative to the support body 20. This support body Y-axis connecting portion 52 connects the support body 20 and the first strain body connecting portion 32a. The other one of the support body Y-axis connecting portions 52 is disposed at a position on the negative side of the Y-axis. This support body Y-axis connecting portion 52 connects the support body 20 and the third strain body connecting portion 32c.

The support body Y-axis connecting portion 52 according to the present embodiment is disposed on the Y-axis, and extends along the Y-axis. In the present embodiment, similar to the force receiving body Y-axis connecting portion 41, the support body Y-axis connecting portion 52 is formed into a rectangular shape along the X-axis, the Y-axis, and the Z-axis. The dimension (equivalent to Lz in FIG. 7) of the support body Y-axis connecting portion 52 in the Z-axis direction is greater than the dimension (Q2y in FIG. 2) of the support body Y-axis connecting portion 52 in the Y-axis direction.

In the present embodiment, the dimension Q2x) of the support body Y-axis connecting portion 52 in the X-axis direction is smaller than the dimension (Q1y) of the support body X-axis connecting portion 51 in the Y-axis direction. In other words, when seen along the Z-axis, the width of the support body Y-axis connecting portion 52 is smaller than the width of the support body X-axis connecting portion 51. In addition, the dimension (Q2y) of the support body Y-axis connecting portion 52 in the Y-axis direction may be equal to the dimension (Q1x) of the support body X-axis connecting portion 51 in the X-axis direction.

As illustrated in FIG. 6, the detection element 60 is configured to detect a displacement of the displacement portion 35 of each of the deformable bodies 31a to 31d described above in the Z-axis direction. The detection element 60 detects elastic deformation caused in the four deformable bodies 31a to 31d described above. The detection element 60 is configured as an element that detects capacitance. More specifically, as illustrated in FIG. 2, the detection element 60 includes a first capacitive element 61a, a second capacitive element 61b, a third capacitive element 61c, and a fourth capacitive element 61d. The first capacitive element 61a detects a displacement of the displacement portion 35 in the Z-axis direction caused by the elastic deformation of the first deformable body 31a. The second capacitive element 61b detects a displacement of the displacement portion 35 in the Z-axis direction caused by the elastic deformation of the second deformable body 31b. The third capacitive element 61c detects a displacement of the displacement portion 35 in the Z-axis direction caused by the elastic deformation of the third deformable body 31c. The fourth capacitive element 61d detects a displacement of the displacement portion 35 in the Z-axis direction caused by the elastic deformation of the fourth deformable body 31d.

As illustrated in FIG. 6, each of the capacitive elements 61a to 61d includes a displacement electrode 62 and a fixed electrode 63. The displacement electrode 62 is provided on the lower surface 35a of the displacement portion 35. When the displacement portion 35 is formed of an electrically conductive material, an insulating layer 64 may be interposed between the displacement portion 35 and the displacement electrode 62. The fixed electrode 63 is provided on an upper surface 80b of the electrode support body 80 described later. When the electrode support body 80 is formed of an electrically conductive material, an insulating layer 65 may be interposed between the electrode support body 80 and the fixed electrode 63. The displacement electrode 62 and the fixed electrode 63 are apart from each other, and face each other. This enables detection of capacitance between the displacement electrode 62 and the fixed electrode 63. Even if the displacement electrode 62 is displaced in the X-axis direction, the Y-axis direction, and the Z-axis direction, the displacement electrode 62 may overlap the fixed electrode 63 as a whole, when seen along the Z-axis. Accordingly, the facing area of the displacement electrode 62 and the fixed electrode 63 can be restrained from changing, even if the displacement electrode 62 is displaced. Thus, a change in the facing area can be restrained from having influence on a change in a capacitance value.

As illustrated in FIGS. 3 and 6, the fixed electrode 63 of each of the capacitive elements 61a to 61d is supported by the electrode support body 80. More specifically, the fixed electrode 63 is provided on the upper surface 80b of the electrode support body 80. The electrode support body 80 may be mounted to the support body 20 by use of a non-illustrated bolt for example. Accordingly, the electrode support body 80 can be restrained from being displaced even if moment Mz acts on the force receiving body 10. The electrode support body 80 may be formed into a circular ring shape when seen along the Z-axis. In addition, in FIG. 3, the upper surface 80b of the electrode support body 80 is in contact with the lower surface 10b of the force receiving body 10, for convenience. However, a clearance may be formed between the force receiving body 10 and the electrode support body 80. Alternatively, a packing 84 (see FIG. 14) described later may be interposed between the force receiving body 10 and the electrode support body 80.

As illustrated in FIG. 3, the detection circuit 70 is configured to output an electric signal indicating moment, based on a detection result of the detection element 60. The detection circuit 70 may have, for example, a calculation function configured by a microprocessor. Moreover, the detection circuit 70 may have an A/D converting function of converting, into a digital signal, an analog signal received from the above-described detection element 60, or a function of amplifying a signal. The detection circuit 70 may include a terminal that outputs an electric signal, and an electric signal is transmitted to the above-described control unit 1400 from this terminal via the electric cable 1300 (see FIG. 1).

Figure 8:
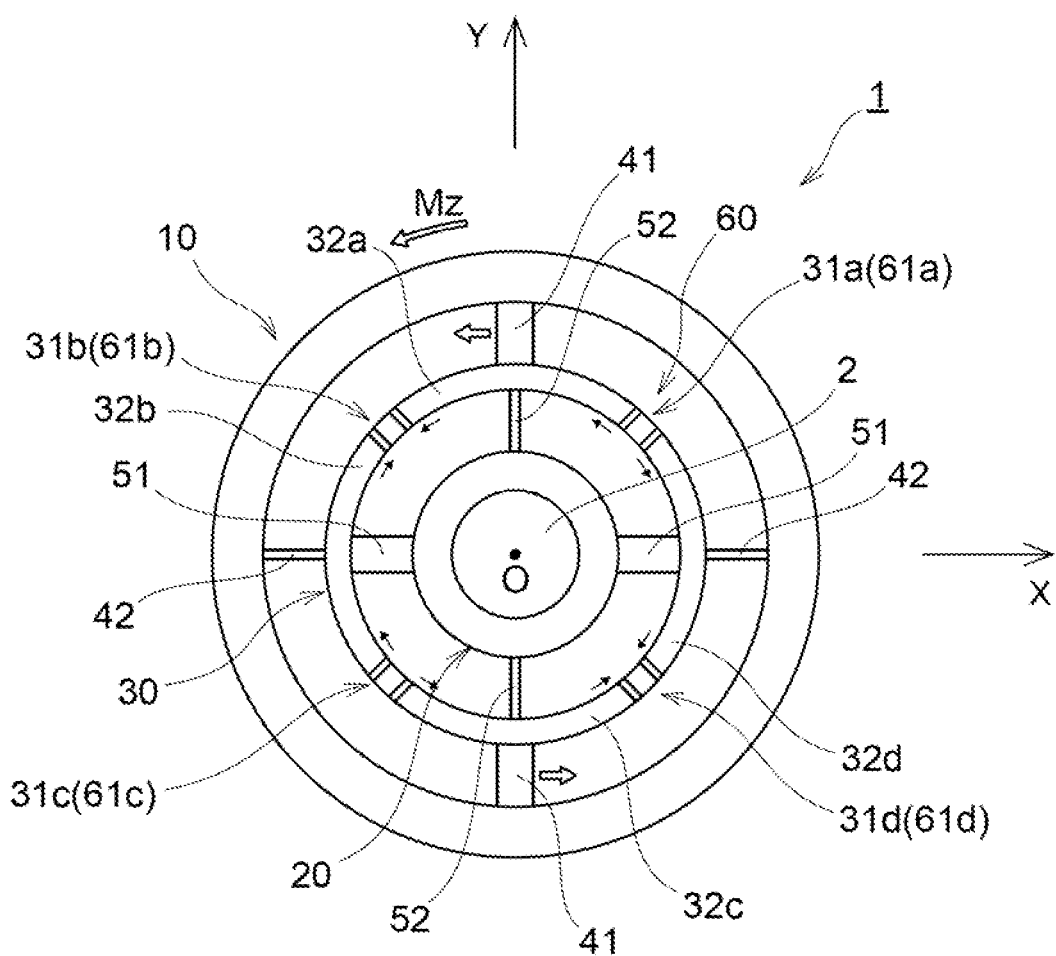
FIG. 8 is a plan view illustrating a case where moment about a Z-axis acts on the torque sensor in FIG. 2.
Figure 9:
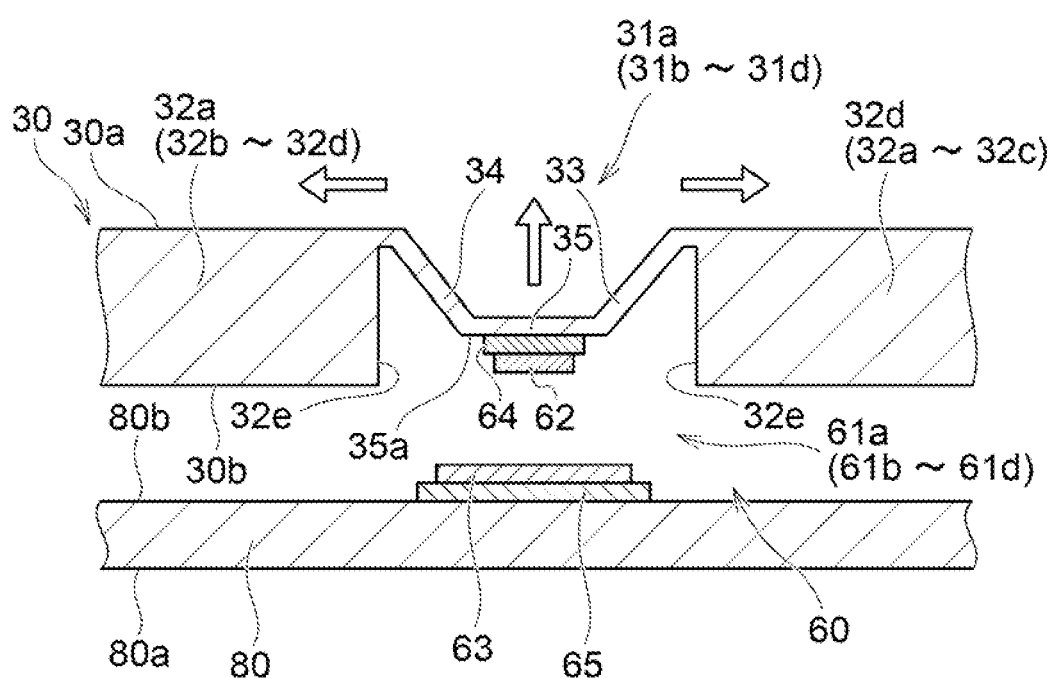
FIG. 9 is a sectional view illustrating how the capacitance value of the capacitive element in FIG. 6 decreases.
Figure 10:
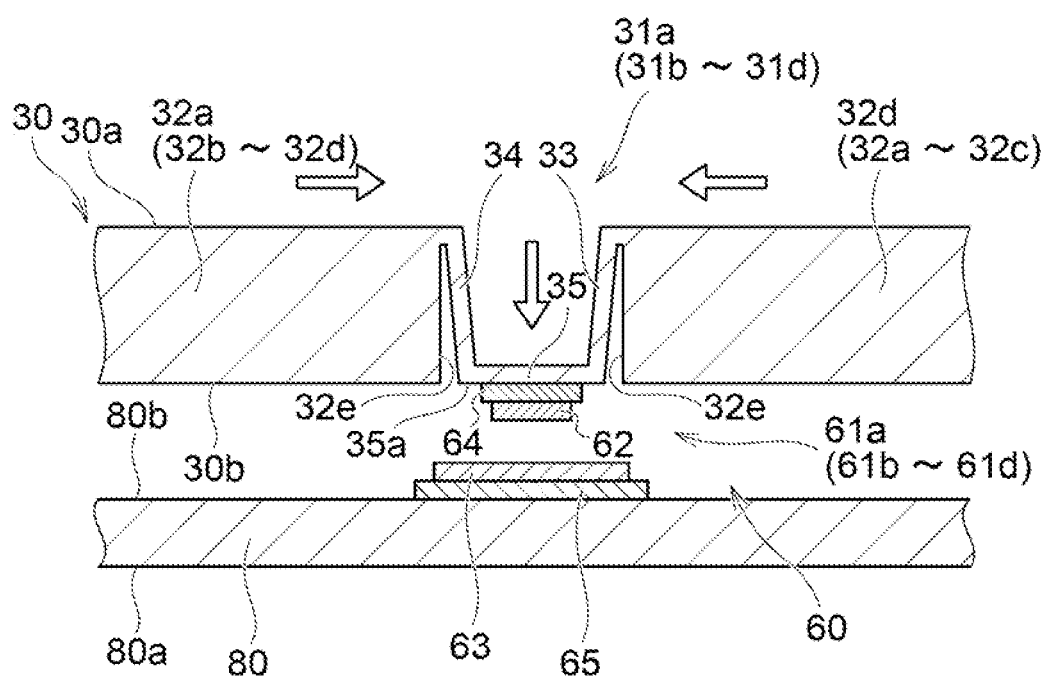
FIG. 10 is a sectional view illustrating how the capacitance value of the capacitive element in FIG. 6 increases.

Next, a method of detecting moment acting on the torque sensor 1 in the present embodiment having such a configuration is described by use of FIGS. 8 to 10. FIG. 8 is a plan view illustrating a case where moment about the Z-axis acts on the torque sensor 1 in the present embodiment. FIG. 9 is a sectional view illustrating how the capacitance value of the capacitive element in FIG. 6 decreases. FIG. 10 is a sectional view illustrating how the capacitance value of the capacitive element in FIG. 6 increases.

When the force receiving body 10 of the torque sensor 1 illustrated in FIG. 2 receives the action of the moment Mz about the Z-axis, the first deformable portion 33 and the second deformable portion 34 of each of the deformable bodies 31a to 31d are elastically deformed, and a displacement in the Z-axis direction is caused to the displacement portion 35. Thus, the distance between each of the displacement electrodes 62 of the detection element 60 and the corresponding fixed electrode 63 changes, and the capacitance value of each of the capacitive elements 61a to 61d changes. This change in capacitance value is detected by the detection element 60 as a displacement caused to the strain body 30. A change in the capacitance value of each of the capacitive elements 61a to 61d can be varied. Thus, the detection circuit 70 can detect the magnitude of the moment Mz acting on the force receiving body 10, based on a change in the capacitance value of each of the capacitive elements 61a to 61d detected by the detection element 60.

A case where the moment Mz about the Z-axis acts on the force receiving body 10 of the torque sensor 1 in FIG. 2 is described in more detail. Here, a case where the clockwise moment Mz acts toward the positive side in the Z-axis direction is described.

As illustrated in FIG. 2, the dimension (P2y) of the force receiving body X-axis connecting portion 42 in the Y-axis direction is smaller than the dimension (P1x) of the force receiving body Y-axis connecting portion 41 in the X-axis direction. Accordingly, when the moment Mz acts, the force receiving body X-axis connecting portion 42 becomes smaller in spring constant than the force receiving body Y-axis connecting portion 41, and becomes easier to elastically deform. The force receiving body Y-axis connecting portion 41 becomes greater in spring constant, and substantially functions as a rigid body. Moreover, the dimension (Q2x) of the support body Y-axis connecting portion 52 in the X-axis direction is smaller than the dimension (Q1y) of the support body X-axis connecting portion 51 in the Y-axis direction. Accordingly, when the moment Mz about the Z-axis acts, the support body Y-axis connecting portion 52 becomes smaller in spring constant than the support body X-axis connecting portion 51, and becomes easier to elastically deform. The support body X-axis connecting portion 51 becomes greater in spring constant, and substantially functions as a rigid body.

A change in the capacitance value of the first capacitive element 61a is described. The first strain body connecting portion 32a is connected to the force receiving body 10 via the force receiving body Y-axis connecting portion 41, and connected to the support body 20 via the support body Y-axis connecting portion 52. Accordingly, as illustrated in FIG. 8, the first strain body connecting portion 32a is supported by the force receiving body Y-axis connecting portion 41, and displaced in the acting direction of the moment Mz. On the other hand, the fourth strain body connecting portion 32d is connected to the support body 20 via the support body X-axis connecting portion 51, and connected to the force receiving body 10 via the force receiving body X-axis connecting portion 42. Accordingly, the fourth strain body connecting portion 32d is supported by the support body X-axis connecting portion 51, and is not substantially displaced. Thus, tensile force is applied to the first deformable body 31a, and the displacement portion 35 of the first deformable body 31a is displaced to the Z-axis positive side, as illustrated in FIG. 9. In this case, the inter-electrode distance between the displacement electrode 62 and the fixed electrode 63 constituting the first capacitive element 61a is increased, and the capacitance value of the first capacitive element 61a is decreased.

A change in the capacitance value of the second capacitive element 61b is described. As illustrated in FIG. 8, the first strain body connecting portion 32a is supported by the force receiving body Y-axis connecting portion 41, and is displaced in the acting direction of the moment Mz. On the other hand, the second strain body connecting portion 32b is connected to the support body 20 via the support body X-axis connecting portion 51, and connected to the force receiving body 10 via the force receiving body X-axis connecting portion 42. Accordingly, the second strain body connecting portion 32b is supported by the support body X-axis connecting portion 51, and is not substantially displaced. Thus, compressive force is applied to the second deformable body 31b, and the displacement portion 35 of the second deformable body 31b is displaced to the Z-axis negative side, as illustrated in FIG. 10. In this case, the inter-electrode distance between the displacement electrode 62 and the fixed electrode 63 constituting the second capacitive element 61b is decreased, and the capacitance value of the second capacitive element 61b is increased.

Similarly, tensile force is applied to the third deformable body 31c as illustrated in FIG. 8, and the displacement portion 35 of the third deformable body 31c is displaced to the Z-axis positive side, as illustrated in FIG. 9. In this case, the inter-electrode distance between the displacement electrode 62 and the fixed electrode 63 constituting the third capacitive element 61c is increased, and the capacitance value of the third capacitive element 61c is decreased. Moreover, compressive force is applied to the fourth deformable body 31d as illustrated in FIG. 8, and the displacement portion 35 of the fourth deformable body 31d is displaced to the Z-axis negative side as illustrated in FIG. 10. In this case, the inter-electrode distance between the displacement electrode 62 and the fixed electrode 63 constituting the fourth capacitive element 61d is decreased, and the capacitance value of the fourth capacitive element 61d is increased.

The moment Mz acting on the force receiving body 10 is detected by $$Mz = -\Delta C1 + \Delta C2 - \Delta C3 + \Delta C4.$$

In addition, moment and a change amount of a capacitance value are connected by "=" for convenience in the equation below. However, because moment and a capacitance value are physical quantities different from each other, moment is actually calculated by converting a change amount of a capacitance value. $\Delta C1$ in the above equation indicates a change amount of the capacitance value of the first capacitive element 61a, and $\Delta C2$ indicates a change amount of the capacitance value of the second capacitive element 61b. $\alpha C3$ indicates a change amount of the capacitance value of the third capacitive element 61c, and $\Delta C4$ indicates a change amount of the capacitance value of the fourth capacitive element 61d.

$$C1 = C01 + \Delta C1, \text{ where}$$

C01 is the capacitance value of the first capacitive element 61a in a neutral state, and C1 is the capacitance value of the first capacitive element 61a when the moment Mz acts on the force receiving body 10. Similarly, $$C2 = C02 + \Delta C2$$

$$C3 = C03 + \Delta C3$$

$$C4 = C04 + \Delta C4.$$

When C01 to C04 are the same, the moment Mz may be $$Mz = -C1 + C2 - C3 + C4,$$

This is because C01 to C04 are offset. The neutral state means a state where no force or moment acts on the force receiving body 10.

In this way, the torque sensor 1 according to the present embodiment can effectively detect the above-described moment Mz about the Z-axis. However, the torque sensor 1 according to the present embodiment is not suited to the detection of force or moment other than the moment Mz. This is described below.

(When Fx Acts)

When force Fx acts on the force receiving body 10 of the torque sensor 1 in FIG. 2 on the positive side in the X-axis direction, tensile force is applied to the force receiving body X-axis connecting portion 42 located on the positive side of the X-axis, and the support body X-axis connecting portion 51 located on the positive side of the X-axis. Compressive force is applied to the force receiving body X-axis connecting portion 42 located on the negative side of the X-axis, and the support body X-axis connecting portion 51 located on the negative side of the X-axis. However, each of the force receiving body X-axis connecting portions 42 and each of the support body X-axis connecting portions 51 extend along the X-axis, therefore have a large spring constant in response to force in the X-axis direction, and substantially function as rigid bodies. Thus, the elastic deformation of the strain body 30 can be restrained, and the capacitance value of each of the capacitive elements 61a to 61d can be restrained from changing. When the force Fx acts on the force receiving body 10 on the X-axis negative side as well, the capacitance value of each of the capacitive elements 61a to 61d can be restrained from changing. When the strain body 30 is formed into a circular ring shape as in the present embodiment, the elastic deformation of the strain body 30 in response to the force Fx can be further restrained.

(When Fy Acts)

A case where force Fy acts on the force receiving body 10 of the torque sensor 1 in FIG. 2 on the positive side of the Y-axis is described. Similar to the case where the Fx acts, each of the force receiving body Y-axis connecting portions 41 and each of the support body Y-axis connecting portions 52 extend along the Y-axis, therefore have a large spring constant in response to the force Fy in the Y-axis direction, and substantially function as rigid bodies. Thus, even if the force Fy acts, the elastic deformation of the strain body 30 can be restrained, and the capacitance value of each of the capacitive elements 61a to 61d can be restrained from changing.

(When Fz Acts)

A case where force Fz in the Z-axis direction acts on the force receiving body 10 of the torque sensor 1 in FIG. 2 is described. As described above, the dimension of each of the force receiving body Y-axis connecting portions 41 in the Z-axis direction is greater than the dimension (P1y) of the force receiving body Y-axis connecting portion 41 in the Y-axis direction, and the dimension of each of the force receiving body X-axis connecting portions 42 in the z-axis direction is greater than the dimension (P2x) of the force receiving body X-axis connecting portion 42 in the X-axis direction. Moreover, the dimension of each of the support body X-axis connecting portions 51 in the Z-axis direction is greater than the dimension (Q1x) of the support body X-axis connecting portion 51 in the X-axis direction, and the dimension of each of the support body Y-axis connecting portions 52 in the Z-axis direction is greater than the dimension (Q2y) of the support body Y-axis connecting portion 52 in the Y-axis direction. Accordingly, each of the connecting portions 41, 42, 51, and 52 has a large spring constant in response to force in the Z-axis direction, and substantially functions as a rigid body. The support body X-axis connecting portion 51 and the support body Y-axis connecting portion 52 are connected to the support body 20, thereby restraining the strain body 30 from being displaced relative to the support body 20 in the z-axis direction. The force receiving body Y-axis connecting portion 41 and the force receiving body X-axis connecting portion 42 are connected to the strain body 30, thereby restraining the force receiving body 10 from being displaced relative to the strain body 30 in the Z-axis direction. Thus, even if the force Fz acts on the force receiving body 10, the elastic deformation of the strain body 30 can be restrained, and the capacitance value of each of the capacitive elements 61a to 61d can be restrained from changing. When the strain body 30 is formed into a circular ring shape as in the present embodiment, the elastic deformation of the strain body 30 in response to the force Fz can be further restrained.

(When Mx Acts)

A case where moment Mx about the X-axis acts on the force receiving body 10 of the torque sensor 1 in FIG. 2 is described. In this case, torsional force about the X-axis acts on each of the force receiving body X-axis connecting portions 42 and each of the support body X-axis connecting portions 51. Bending moment in the Z-axis direction acts on each of the force receiving body Y-axis connecting portions 41 and each of the support body Y-axis connecting portions 52. However, each of the force receiving body Y-axis connecting portions 41 and each of the support body Y-axis connecting portions 52 have a large spring constant in response to force in the Z-axis direction, and substantially function as rigid bodies. Thus, even if the moment Mx acts on the force receiving body 10, the elastic deformation of the strain body 30 can be restrained, and the capacitance value of each of the capacitive elements 61a to 61d can be restrained from changing. When the strain body 30 is formed into a circular ring shape as in the present embodiment, the elastic deformation of the strain body 30 in response to the moment Mx can be further restrained.

(When My Acts)

A case where moment My about the Y-axis acts on the force receiving body 10 of the torque sensor 1 in FIG. 2 is described. Similar to the case where the moment Mx acts, each of the force receiving body X-axis connecting portions 42 and each of the support body X-axis connecting portions 51 have a large spring constant in response to force in the Z-axis direction, and substantially function as rigid bodies. Thus, even if the moment My acts on the force receiving body 10, the elastic deformation of the strain body 30 can be restrained, and the capacitance value of each of the capacitive elements 61a to 61d can be restrained from changing. When the strain body 30 is formed into a circular ring shape as in the present embodiment, the elastic deformation of the strain body 30 in response to the moment My can be further restrained.

Hence, the torque sensor 1 according to the present embodiment is not suited to detection of force or moment other than the moment Mz about the Z-axis. Thus, the moment Mz about the Z-axis can be accurately detected.

In this way, according to the present embodiment, the force receiving body Y-axis connecting portions 41 that connect the force receiving body 10 and the strain body 30 are disposed on the positive side and negative side of the Y-axis relative to the strain body 30, and the support body X-axis connecting portions 51 that connect the strain body 30 and the support body 20 are disposed on the positive side and negative side of the X-axis relative to the support body 20. The strain body 30 includes the four deformable bodies 31a to 31d each including the displacement portion 35 that is displaced in the Z-axis direction by elastic deformation, and the detection element 60 includes the capacitive elements 61a to 61d that each detect a change in capacitance value by the displacement of the displacement portion 35 of each of the deformable bodies 31a to 31d in the Z-axis direction. Accordingly, when the moment Mz about the X-axis acts on the force receiving body 10, tensile force or compressive force can be applied to each of the deformable bodies 31a to 31d of the strain body 30 disposed in the first to fourth quadrants. Thus, the displacement portion 35 of each of the deformable bodies 31a to 31d can be displaced in the Z-axis direction, and the displacement electrode 62 and the fixed electrode 63 constituting each of the capacitive elements 61a to 61d can be disposed so as to face in the Z-axis direction. In this case, the facing surfaces of the displacement electrode 62 and the fixed electrode 63 can be disposed along the XY plane, and the alignment of the displacement electrode 62 and the fixed electrode 63 can be facilitated. Moreover, the four fixed electrodes 63 disposed on the electrode support body 80 can be combined into a common fixed electrode, in which case as well, the alignment of the displacement electrode 62 and the fixed electrode 63 can be facilitated. As a result, the efficiency of manufacturing the torque sensor 1 can be improved.

Moreover, according to the present embodiment, the support body 20 is disposed inside the force receiving body 10, when seen along the Z-axis. Accordingly, the force receiving body 10, the strain body 30, and the support body 20 can be disposed along the XY plane. Thus, the thickness (dimension in the Z-axis direction) of the torque sensor 1 can be lessened, and the torque sensor 1, can be formed thinner.

Moreover, according to the present embodiment, the dimension of the force receiving body Y-axis connecting portion 41 in the Z-axis direction is greater than the dimension (P1y) of the force receiving body Y-axis connecting portion 41 in the Y-axis direction, and the dimension of the support body X-axis connecting portion 51 in the Z-axis direction is greater than the dimension (Q1x) of the support body X-axis connecting portion 51 in the X-axis direction. This allows the force receiving body Y-axis connecting portion 41 and the support body X-axis connecting portion 51 to substantially function as rigid bodies in response to force in the Z-axis direction. Thus, even if the force Fz in the Z-axis direction acts on the force receiving body 10, the elastic deformation of each of the deformable bodies 31a to 31d of the strain body 30 can be restrained. Similarly, even if the moment Mx about the X-axis and the moment My about the Y-axis act on the force receiving body 10, the elastic deformation of each of the deformable bodies 31a to 31d of the strain body 30 can be restrained. Thus, even if the force Fz the moment Mx, or the moment My acts, the capacitance value of each of the capacitive elements 61a to 61d can be restrained from changing, and the detection of the force Fz, the moment Mx, and the moment My can be restrained.

Moreover, according to the present embodiment, the force receiving body X-axis connecting portions 42 that connect the force receiving body 10 and the strain body 30 are disposed on the positive side and negative side of the X-axis relative to the strain body 30. The support body X-axis connecting portions 51 that connect the strain body 30 and the support body 20 are disposed on the positive side and negative side of the X-axis relative to the support body 20. The force receiving body X-axis connecting portion 42 and the support body X-axis connecting portion 51 each extend along the X-axis. Accordingly, even if the force Fx in the X-axis direction acts on the force receiving body 10, the force receiving body X-axis connecting portion 42 and the support body X-axis connecting portion 51 can substantially function as rigid bodies, and the elastic deformation of each of the deformable bodies 31a to 31d of the strain body 30 can be restrained. Thus, even if the force Fx in the X-axis direction acts, the capacitance value of each of the capacitive elements 61a to 61d can be restrained from changing, and the detection of the force Fx can be restrained.

Moreover, according to the present embodiment, the force receiving body Y-axis connecting portions 41 that connect the force receiving body 10 and the strain body 30 are disposed on the positive side and negative side of the Y-axis relative to the strain body 30. The support body Y-axis connecting portions 52 that connect the strain body 30 and the support body 20 are disposed on the positive side and negative side of the Y-axis relative to the support body 20. The force receiving body Y-axis connecting portion 41 and the support body Y-axis connecting portion 52 each extend along the Y-axis. Accordingly, even if the force Fy in the Y-axis direction acts on the force receiving body 10, the force receiving body Y-axis connecting portion 41 and the support body Y-axis connecting portion 52 can substantially function as rigid bodies, and the elastic deformation of each of the deformable bodies 31a to 31d of the strain body 30 can be restrained. Thus, even if the force Fy in the Y-axis direction acts, the capacitance value of each of the capacitive elements 61a to 61d can be restrained from changing, and the detection of the force Fy can be restrained.

Moreover, according to the present embodiment, the dimension of the force receiving body X-axis connecting portion 42 in the Z-axis direction is greater than the dimension (P2x) of the force receiving body X-axis connecting portion 42 in the X-axis direction. Further, the dimension of the support body Y-axis connecting portion 52 in the Z-axis direction is greater than the dimension (Q2y) of the support body Y-axis connecting portion 52 in the Y-axis direction. This allows the force receiving body X-axis connecting portion 42 and the support body Y-axis connecting portion 52 to substantially function as rigid bodies in response to force in the Z-axis direction. Thus, even if the force Fz in the Z-axis direction acts on the force receiving body 10, the elastic deformation of each of the deformable bodies 31a to 31d, of the strain body 30 can be further restrained. Similarly, even if the moment. Mx about the X-axis and the moment My about the Y-axis act on the force receiving body 10, the elastic deformation of each of the deformable bodies 31a to 31d of the strain body 30 can be further restrained. Thus, even if the force Fz, the moment Mx, or the moment My acts, the capacitance value of each of the capacitive elements 61a to 61d can be further restrained from changing, and the detection of the force Fz, the moment Mx, and the moment My can be further restrained.

Moreover, according to the present embodiment, the dimension (P2y) of the force receiving body X-axis connecting portion 42 in the Y-axis direction is smaller than the dimension (Pix) of the force receiving body Y-axis connecting portion 41 in the X-axis direction, and the dimension (Q2x) of the support body Y-axis connecting portion 52 in the X-axis direction is smaller than the dimension (Q1y) of the support body X-axis connecting portion 51, in the Y-axis direction. This allows the force receiving body Y-axis connecting portion 41 and the support body X-axis connecting portion 51 to substantially function as rigid bodies when the moment Mz about the Z-axis acts, and the force receiving body X-axis connecting portion 42 and the support body Y-axis connecting portion 52 can be easily elastically deformed. Thus, tensile force or compressive force can be easily applied to each of the deformable bodies 31a to 31d of the strain body 30 disposed in the first to fourth quadrants. As a result, each of the displacement portions 35 of each of the deformable bodies 31a to 31d can be easily displaced in the Z-axis direction, and a change in the capacitance value of each of the capacitive elements 61a to 61d can be easily detected.

Moreover, according to the present embodiment, the strain body 30 is formed into a circular ring shape when seen along the Z-axis. Accordingly, the deformable bodies 31a to 31d can be connected to each other. Thus, even if force or moment other than the moment Mz about the Z-axis acts, the elastic deformation of each of the deformable bodies 31a to 31d of the strain body 30 can be restrained. As a result, even if force or moment other than the moment Mz acts, the capacitance value of each of the capacitive elements 61a to 61d can be restrained from changing, and the detection of force or moment other than the moment Mz can be restrained.

In addition, in the present embodiment described above, a case has been described where the force receiving body 10 and the strain body 30 are connected by the force receiving body X-axis connecting portion 42, and the strain body 30 and the support body 20 are connected by the support body Y-axis connecting portion 52. However, the present invention is not limited thereto.

Figure 11:
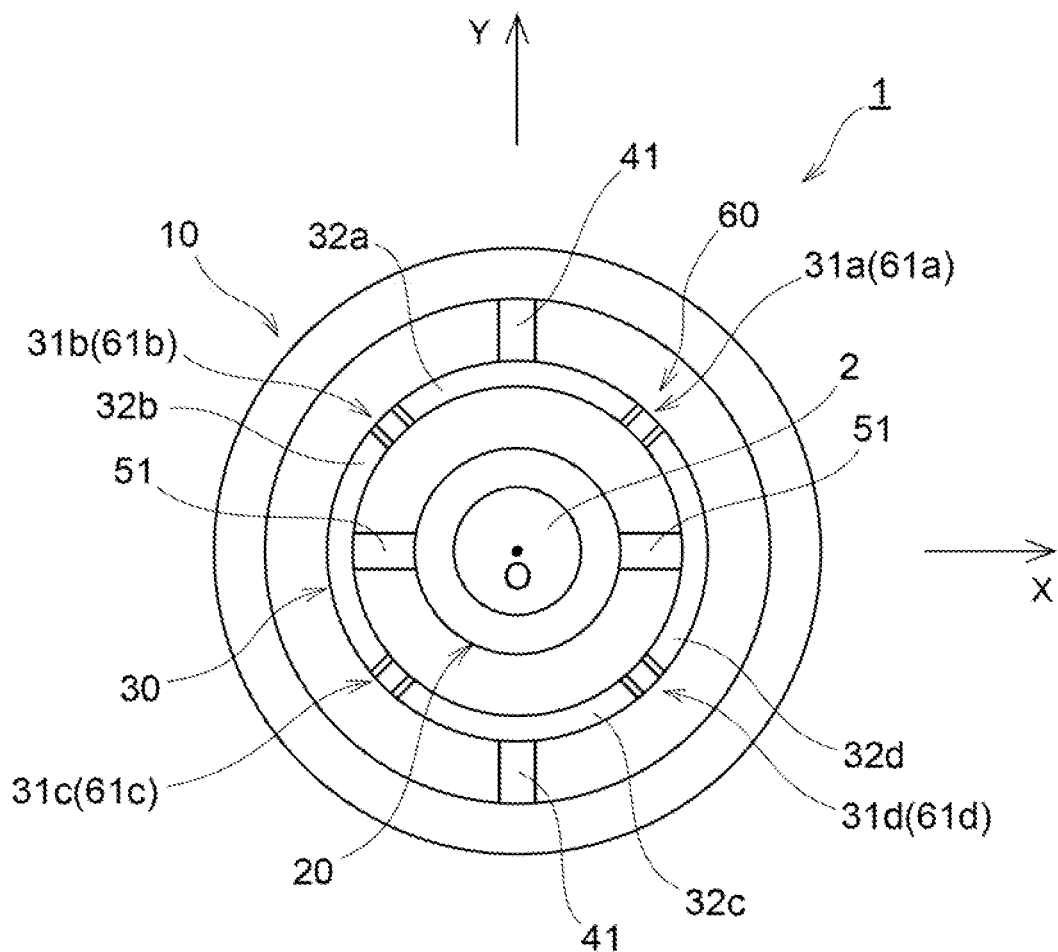
FIG. 11 is a plan view illustrating a modification of the torque sensor in FIG. 2.

For example, as illustrated in FIG. 11, the strain body 30 and the support body 20 does not need to be connected at the position of the strain body 30 where the force receiving body Y-axis connecting portion 41 is connected. That is to say, the first strain body connecting portion 32a and the third strain body connecting portion 32c does not need to be connected to the support body 20 by the support body Y-axis connecting portion 52 as illustrated in FIG. 2. Moreover, the force receiving body 10 and the strain body 30 do not need to be connected at the position of the strain body 30 where the support body X-axis connecting portion 51 is connected. That is to say, the second strain body connecting portion 32b and the fourth strain body connecting portion 32d do not need to be connected to the force receiving body 10 by the force receiving body X-axis connecting portion 42 as illustrated in FIG. 2. FIG. 1i is a plan view illustrating a modification of h torque sensor in FIG. 2.

In the torque sensor 1 illustrated in FIG. 11 as well, the force receiving body 10 and the strain body 30 are connected by the force receiving body Y-axis connecting portion 41, and the strain body 30 and the support body 20 are connected by the support body X-axis connecting portion 51. Accordingly, when the moment Mz about the Z-axis acts, tensile force or compressive force can be applied to each of the deformable bodies 31a to 31d of the strain body 30 disposed in the first to fourth quadrants. Thus, the displacement portion 35 of each of the deformable bodies 31a to 31d can be displaced in the Z-axis direction, and the displacement electrode 62 and the fixed electrode 63 constituting each of the capacitive elements 61a to 61d can be disposed so as to face in the Z-axis direction. In this case, the facing surfaces of the displacement electrode 62 and the fixed electrode 63 can be disposed along the XY plane, and the alignment of the displacement electrode 62 and the fixed electrode 63 can be facilitated. As a result, the efficiency of manufacturing the torque sensor 1 can be improved.

In this way, according to the modification illustrated in FIG. 11, the strain body 30 and the support body 20 are not connected at the position of the strain body 30 where the force receiving body Y-axis connecting portion 41 is connected, and the force receiving body 10 and the strain body 30 are not connected at the position of the strain body 30 where the support body X-axis connecting portion 51 is connected. Accordingly, while the efficiency of manufacturing the torque sensor 1 is improved, the structure of the torque sensor 1 can be simplified, and price lowering can be achieved.

Moreover, in the present embodiment described above, an example has been described in which one force receiving body Y-axis connecting portion 41 is disposed on each of the positive and negative sides of the Y-axis relative to the strain body 30. However, the present invention is not limited thereto.

Figure 12:
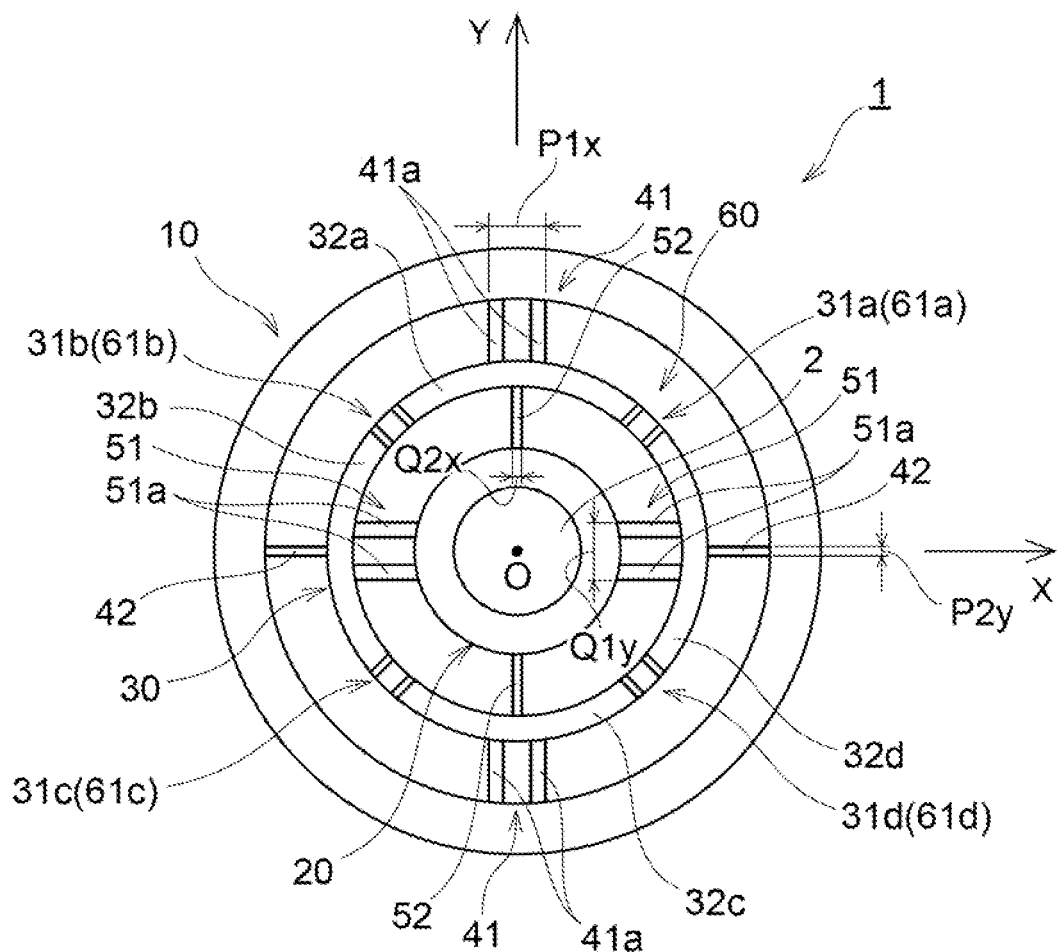
FIG. 12 is a plan view illustrating another r modification of the torque sensor in FIG. 2.

For example, as illustrated in FIG. 12, each of the force receiving body Y-axis connecting portions 41 may include two force receiving body Y-axis divided portions 41a. FIG. 12 is a plan view illustrating another modification of the torque sensor in FIG. 2.

In the modification illustrated in FIG. 12, the two force receiving body Y-axis divided portions 41a are respectively disposed on the positive and negative sides of the Y-axis relative to the strain body 30. The force receiving body Y-axis divided portions 41a may be formed into a rectangular shape along the X-axis, the Y-axis, and the Z-axis. The dimension of the force receiving body Y-axis divided portion 41a in the X-axis direction may be greater than the dimension (P2y) of the force receiving body X-axis connecting portion 42 in the Y-axis direction. The two force receiving body Y-axis divided portions 41a constituting one force receiving body Y-axis connecting portion 41 may be apart from each other in the X-axis direction, and may be parallel to each other. The two force receiving body Y-axis divided portions 41a constituting one force receiving body Y-axis connecting portion 41 may be disposed symmetrically with respect to the Y-axis. That is to say, one of the two force receiving body Y-axis divided portions 41a is disposed on the positive side of the X-axis relative to the Y-axis, and the other is disposed on the negative side of the X-axis relative to the Y-axis. In addition, the two force receiving body Y-axis divided portions 41a constituting one force receiving body Y-axis connecting portion 41 may be disposed asymmetrically with respect to the Y-axis. It may be that the two force receiving body Y-axis divided portions 41a are disposed on one of the positive and negative sides of the X-axis relative to the Y-axis, and are not disposed on the other. As illustrated in FIG. 12, the dimension (Pix in FIG. 12) of the force receiving body Y-axis connecting portion 41 in the X-axis direction may be the dimension of the two force receiving body Y-axis divided portions 41a in the X-axis direction.

Similarly, as illustrated in FIG. 12, each of the support body X-axis connecting portions 51 may include two support body X-axis divided portions 51a.

In the modification illustrated in FIG. 12, the two support body X-axis divided portions 51a are respectively disposed on the positive and negative sides of the Y-axis relative to the strain body 30. The support body X-axis divided portions 51a may be formed into a rectangular shape along the X-axis, the Y-axis and the Z-axis. The dimension of the support body X-axis divided portion 51a in the Y-axis direction may be greater than the dimension (Q2x) of the support body Y-axis connecting portion 52 in the X-axis direction. The two support body X-axis divided portions 51a constituting one support body X-axis connecting portion 51 may be apart from each other in the Y-axis direction, and may be parallel to each other. The two support body X-axis divided portions 51*a* constituting one support body X-axis connecting portion 51 may be disposed symmetrically with respect to the X-axis. That is to say, one of the two support body X-axis divided portions 51*a* is disposed on the positive side of the Y-axis relative to the X-axis, and the other is disposed on the negative side of the Y-axis relative to the X-axis. In addition, the two support body X-axis divided portions 51*a* constituting one support body X-axis connecting portion 51 may be disposed asymmetrically with respect to the X-axis. It may be that the two support body X-axis divided portions 51*a* are disposed on one of the positive and negative sides of the Y-axis relative to the X-axis, and are not disposed on the other. As illustrated in FIG. 12, the dimension (Q1*y* in F 12) of the support body X-axis connecting portion 51 in the Y-axis direction may be the dimension of the two support body X-axis divided portions 51*a* in the Y-axis direction.

In this way, according to the modification illustrated in FIG. 12, the force receiving body Y-axis connecting portion 41 includes the two force receiving body Y-axis divided portions 41*a*. Accordingly, while the moment Mz about the Z-axis acts on the force receiving body 10, the rigidity of the force receiving body Y-axis connecting portion 41 can be increased. This can facilitate displacing each of the displacement portions 35 of each of the deformable bodies 31*a* to 31*d* of the strain body 30 in the Z-axis direction, and detect a change in the capacitance value of each of the capacitive elements 61*a* to 61*d*.

Moreover, according to the modification illustrated in FIG. 12, the support body X-axis connecting portion 51 includes the two support body X-axis divided portions 51*a*. Accordingly, when the moment Mz about the Z-axis acts on the force receiving body 10, the rigidity of the support body X-axis connecting portion 51 can be increased. This can facilitate displacing each of the displacement portions 35 of each of the deformable bodies 31*a* to 31*d* of the strain body 30 in the Z-axis direction, and detect a change in the capacitance value of each of the capacitive elements 61*a* to 61*d*.

In addition, in the modification illustrated in FIG. 12, each of the force receiving body Y-axis connecting portions 41 may include three or more force receiving body Y-axis divided portions 41*a*. Similarly, each of the support body X-axis connecting portions 51 may include three or more support body X-axis divided portions 51*a*.

Moreover, in the modification illustrated in FIG. 12, the force receiving body 10 and the strain body 30 do not need to be connected by the force receiving body X-axis connecting portion 42 as in the modification illustrated in FIG. 11. The strain body 30 and the support body 20 do not need to be connected by the support body Y-axis connecting portion 52.

Moreover, in the present embodiment described above, an example has been described in which the deformable bodies 31*a* to 31*d* each include the first deformable portion 33, the second deformable portion 34, and the displacement portion 35, and the first deformable portion 33 and the second deformable portion 34 are tilted relative to the Z-axis, and extend linearly, when radially seen. However, the present invention is not limited thereto.

Figure 13A:
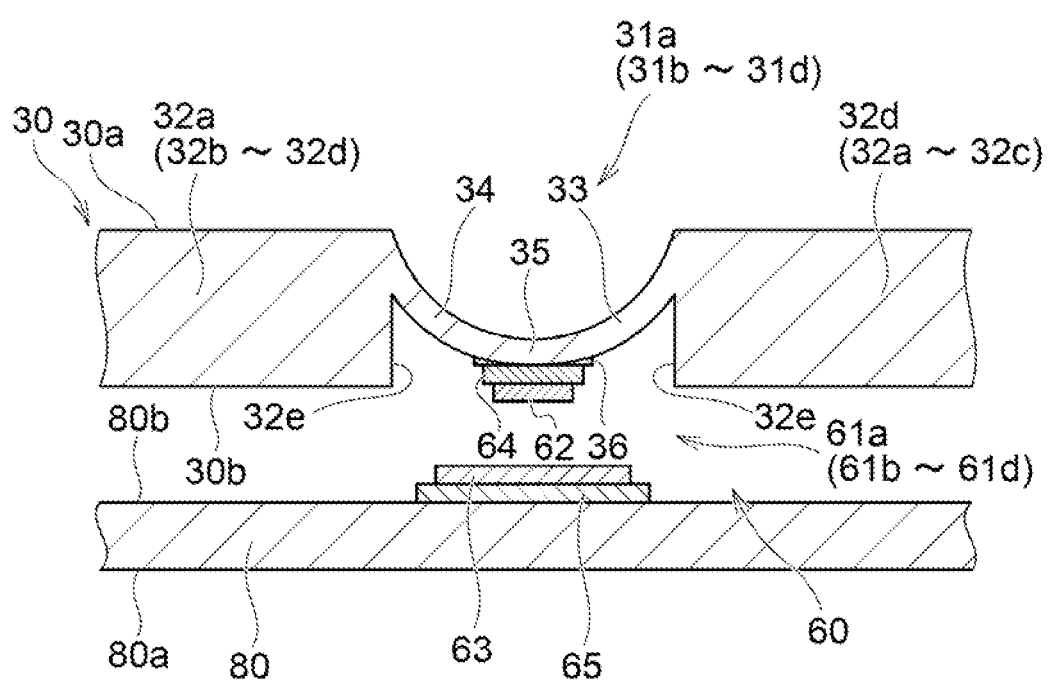
FIG. 13A is a sectional view illustrating a modification of the deformable body in FIG. 6.

For example, as illustrated in FIG. 13A, the deformable bodies 31*a* to 31*d* may be continuously curved convexly toward the Z-axis negative side, when radially seen, FIG. 13A is a sectional view illustrating a modification of the deformable body in FIG. 6.

In the modification illustrated in FIG. 13A as well, when the moment Mz acts on the force receiving body 10, tensile force or compressive force can be applied to each of the deformable bodies 31*a* to 31*d*. Thus, the displacement portion 35 of each of the deformable bodies 31*a* to 31*d* can be displaced in the Z-axis direction, and the displacement electrode 62 and the fixed electrode 63 constituting each of the capacitive elements 61*a* to 61*d* can be disposed so as to face in the Z-axis direction. In the modification illustrated in FIG. 13A, the first deformable portion 33 and the second deformable portion 34 are curved, when radially seen. The displacement portion 35 may be formed into a linear shape similar to the displacement portion 35 illustrated in FIG. 6, when radially seen. However, as illustrated in FIG. 13A, the displacement portion 35 may be curved, when radially seen. In this case, the displacement portion 35 may be provided with a seat 36 for mounting the displacement electrode 62.

According to the modification illustrated in FIG. 13A, the stress concentration of the first deformable portion 33 and the stress concentration of the second deformable portion 34 can be relaxed, and the reliability of the torque sensor 1 can be improved.

Figure 13B:
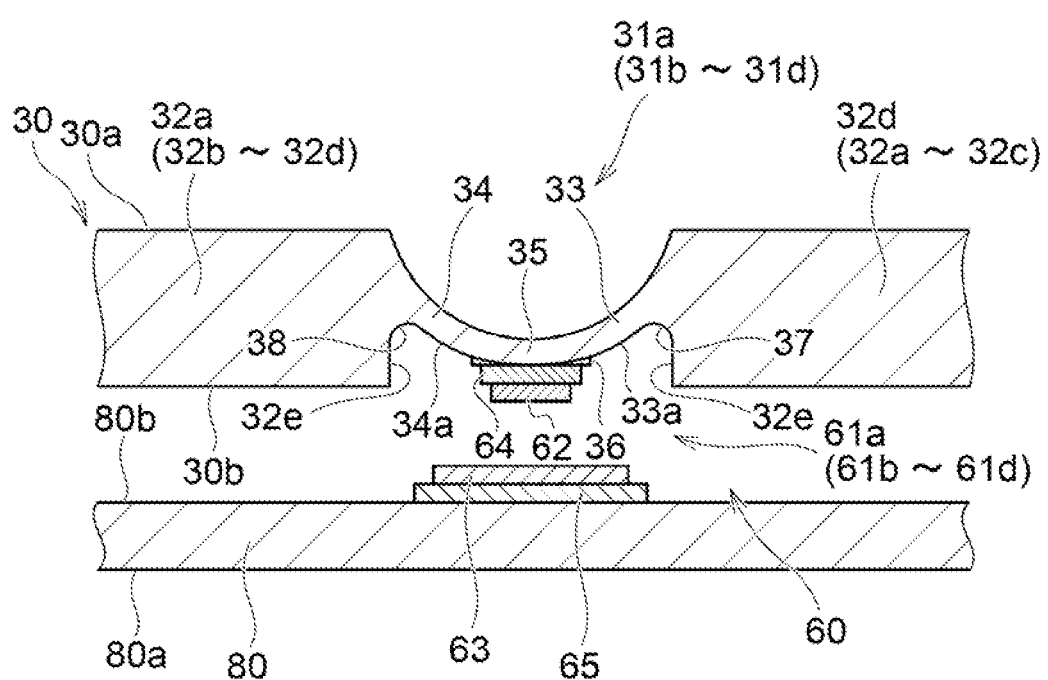
FIG. 13B is a sectional view illustrating another modification of the deformable body in FIG. 6.

Furthermore, for example, as illustrated in FIG. 13B, a lower surface 33*a* of the first deformable portion 33 and the end face 32*e* of each of the strain body connecting portions 32*a* to 32*d* may be connected by a curved surface 37. The curved surface 37 is curved convexly toward the Z-axis positive side, when radially seen. In this case, the stress concentration of the first deformable portion 33 can be further relaxed. A lower surface 34*a* of the second deformable portion 34 and the end face 32*e* of each of the strain body connecting portions 32*a* to 32*d* may also be connected by a curved surface 38 in a similar way. FIG. 13B is a sectional view illustrating another modification of the deformable body in FIG. 6.

Figure 14:
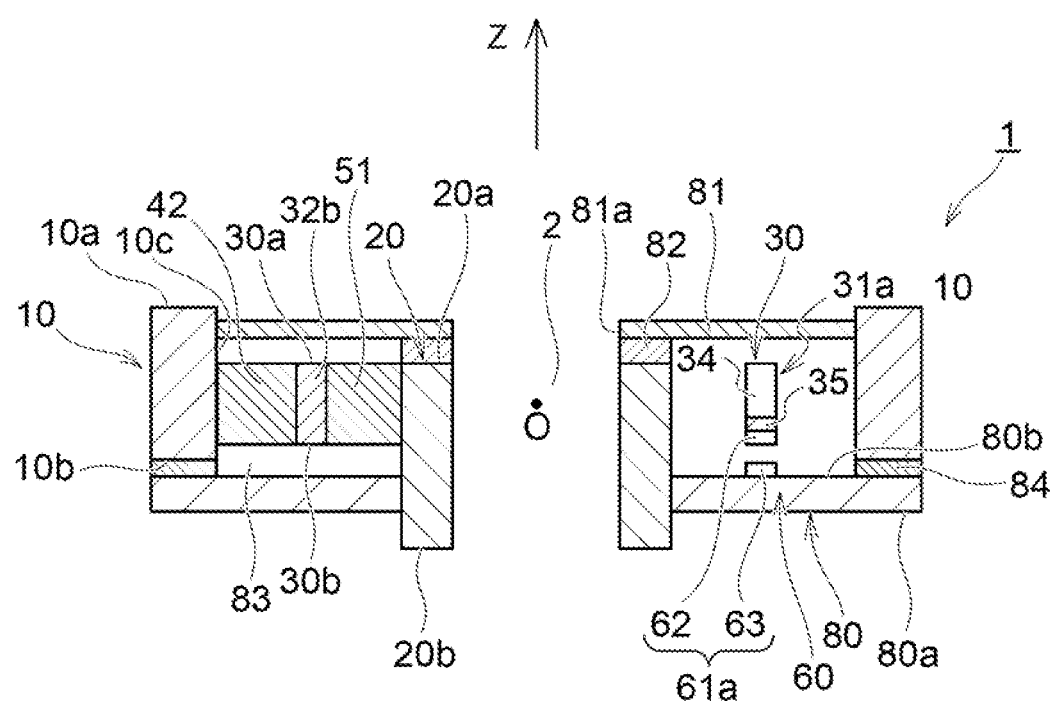
FIG. 14 is a sectional view illustrating a modification of the torque sensor in FIG. 3.

Moreover, the torque sensor 1 according to the present embodiment described above may further include a cover 81. For example, as illustrated in FIG. 14, the cover 81 may be mounted to an inner peripheral surface 10*c* of the force receiving body 10. FIG. 14 is a sectional view illustrating a modification of the torque sensor in FIG. 3, and is a view equivalent to the section along the line A-A in FIG. 2.

The cover 81 may be mounted to the force receiving body 10 by a non-illustrated bolt for example. The cover 81 may have a cover opening 81*a*. The cover 81 may be formed into a circular ring shape when seen along the Z-axis. In this case, blocking of the sensor opening 2 of the torque sensor 1 can be prevented, and a cable and a tube used in the robot can be passed through the sensor opening 2.

As illustrated in FIG. 14, a packing 82 may be interposed between the cover 81 and the support body 20. In this case, entrance of foreign objects such as dust into a space 83 between the force receiving body 10 and the support body 20 from the clearance between the cover 81 and the support body 20 can be prevented, and the reliability of the torque sensor 1 can be improved. The packing 82 may be a material that is soft enough not to inhibit a relative displacement between the force receiving body 10 and the support body 20 when the moment Mz acts. The packing 82 may be produced by, for example, silicone rubber. The packing 82 may be formed into a circular ring shape when seen along the Z-axis, similar to the support body 20.

Moreover, as illustrated in FIG. 14, the packing 84 may be interposed between the force receiving body 10 and the electrode support body 80. In this case, entrance of foreign objects such as dust into a space 83 between the force receiving body 10 and the support body 20 from the clearance between the force receiving body 10 and the electrode support body 80 can be restrained, and the reliability of the torque sensor 1 can be improved. The packing 84 may be a material that is soft enough not to inhibit a relative displacement between the force receiving body 10 and the support body 20 when the moment Mz acts. The packing 84 may be produced by, for example, silicone rubber. The packing 84 may be formed into a circular ring shape when seen along the Z-axis, similar to the force receiving body 10.

Moreover, in the present embodiment described above, an example has been described in which the support body 20 is disposed inside the force receiving body 10 when seen along the Z-axis, so that the force receiving body 10 is equivalent to the first structure, and the support body 20 is equivalent to the second structure. However, the present invention is not limited thereto. For example, the force receiving body 10 may be disposed inside the support body 20 when seen along the Z-axis, so that the force receiving body 10 is equivalent to the second structure, and the support body 20 is equivalent to the first structure. In this case, as well, the strain body 30 may be disposed between the force receiving body 10 and the support body 20.

Second Embodiment

Figure 15:
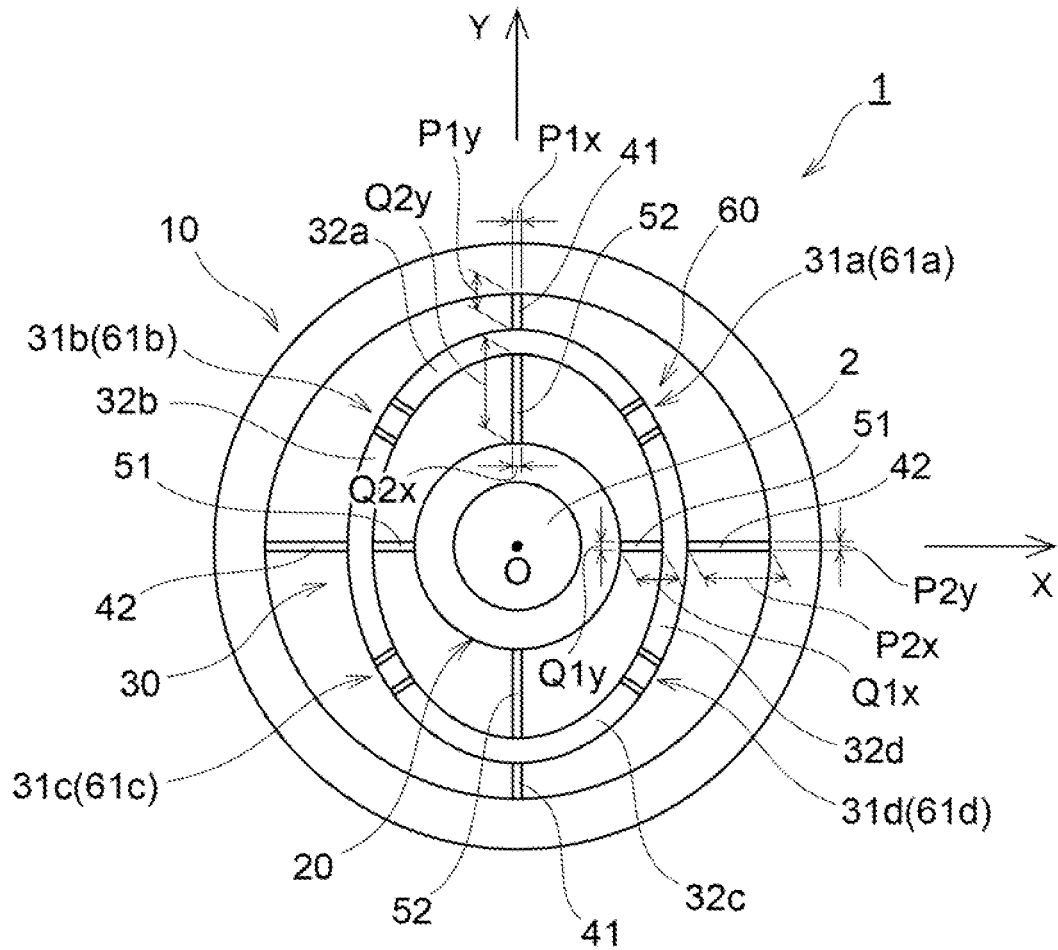
FIG. 15 is a plan view illustrating a torque sensor according to a second embodiment.
Figure 16:
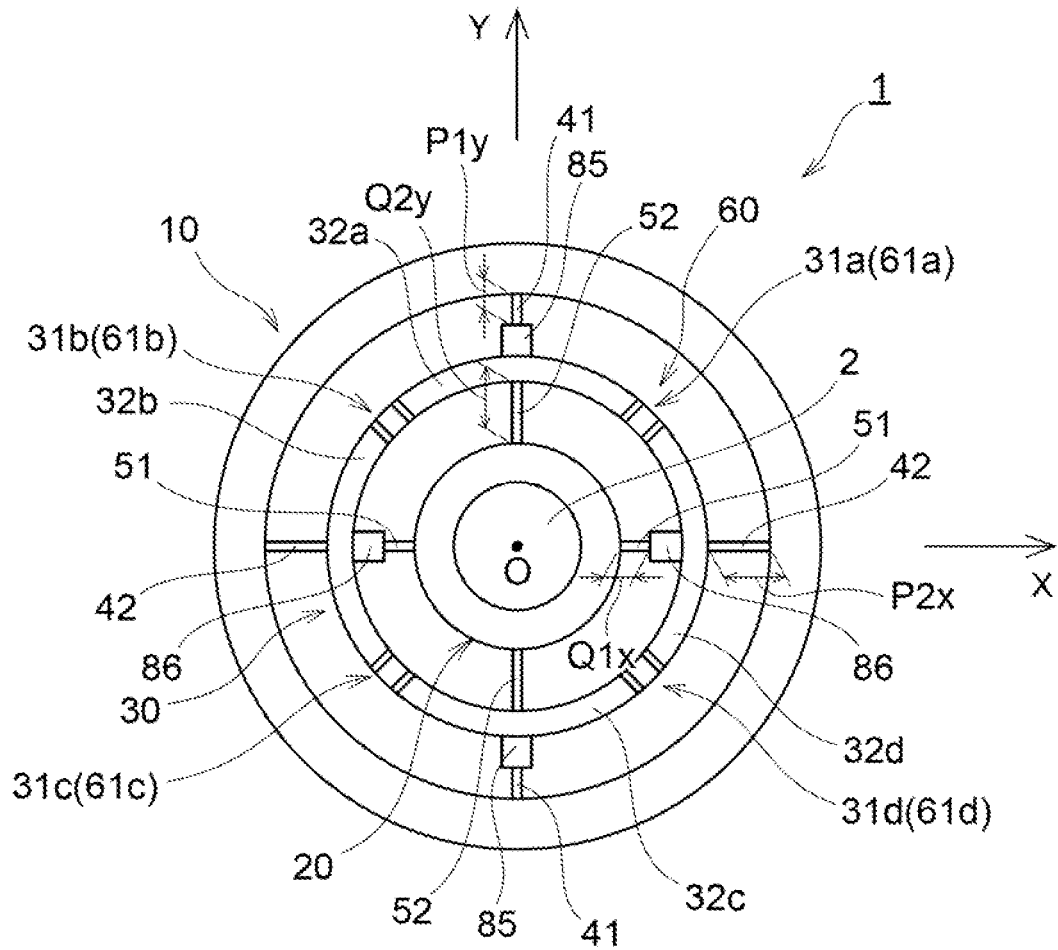
FIG. 16 is a plan view illustrating a modification of the torque sensor in FIG. 15.

Next, a torque sensor according to a second embodiment of the present invention is described by use of FIGS. 15 and 16.

The second embodiment illustrated in FIGS. 15 and 16 is mainly different from the first embodiment illustrated in FIGS. 1 to 14 in that the dimension (P2$x$) of a force receiving body X-axis connecting portion 42 in the X-axis direction is greater than the dimension (P1$y$) of a force receiving body Y-axis connecting portion 41 in the Y-axis direction, and the dimension (Q2$y$) of a support body Y-axis connecting portion 52 in the Y-axis direction is greater than the dimension (Q1$x$) of a support body X-axis connecting portion 51 in the X-axis direction. In other respects, the configuration according to the second embodiment is substantially the same as that according to the first embodiment. In addition, in FIGS. 15 and 16, the same reference signs are assigned to the same parts as those according to the first embodiment illustrated in FIGS. 1 to 14, and the detailed description of these parts is omitted.

A torque sensor 1 according to the present embodiment is described with reference to FIG. 15. FIG. 15 is a plan view illustrating the torque sensor according to the second embodiment.

As illustrated in FIG. 15, in the torque sensor 1 according to the present embodiment, the dimension (P2$x$) of the force receiving body X-axis connecting portion 42 in the X-axis direction is greater than the dimension (P1$y$) of a force receiving body Y-axis connecting portion 41 in the Y-axis direction. In other words, when seen along the Z-axis, the length of the force receiving body X-axis connecting portion 42 is greater than the length of the force receiving body Y-axis connecting portion 41. In FIG. 15, the dimension (P2$y$) of the force receiving body X-axis connecting portion 42 in the Y-axis direction may be equal to the dimension (P1$x$) of the force receiving body Y-axis connecting portion 41 in the X-axis direction. However, the present invention is not limited thereto. As illustrated in FIG. 2, the dimension (P2$y$) of the force receiving body X-axis connecting portion 42 in the Y-axis direction may be smaller than the dimension (P1$x$) of the force receiving body Y-axis connecting portion 41 in the X-axis direction.

Similarly, the dimension (Q2$y$) of the support body Y-axis connecting portion 52 in the Y-axis direction is greater than the dimension (Q1$x$) of the support body X-axis connecting portion 51 in the X-axis direction. In other words, when seen along the Z-axis, the length of the support body Y-axis connecting portion 52 is greater than the length of the support body X-axis connecting portion 51. In FIG. 15, the dimension (Q2$x$) of the support body Y-axis connecting portion 52 in the X-axis direction may be equal to the dimension (Q1$y$) of the support body X-axis connecting portion 51 in the Y-axis direction. However, the present invention is not limited thereto. As illustrated in FIG. 2, the dimension (Q2$x$) of the support body Y-axis connecting portion 52 in the X-axis direction may be smaller than the dimension (Q1$y$ of the support body X-axis connecting portion 51 in the Y-axis direction.

As illustrated in FIG. 15, a strain body 30 may be formed into an elliptical ring shape so as to have a long axis along the Y-axis and a short axis along the X-axis, when seen along the Z-axis. In this case as well, a force receiving body 10, the strain body 30, and a support body 20 may be formed concentrically. The width of the strain body 30 may be circumferentially constant. In addition, in the present embodiment, each of deformable bodies 31$a$ to 31$d$ may be located at an intermediate point between the corresponding force receiving body Y-axis connecting portion 41 (or the support body Y-axis connecting portion 52) and the corresponding force receiving body X-axis connecting portion 42 (or the support body X-axis connecting portion 51) in a direction along the strain body 30, when seen along the Z-axis.

The position of the strain body 30 where the force receiving body Y-axis connecting portion 41 is connected is disposed at a position closer to the force receiving body 10 than to the support body 20. Moreover, the position of the strain body 30 where the support body X-axis connecting portion 51 is connected is disposed at a position closer to the support body 20 than to the force receiving body 10. In this way, the position of the strain body 30 where the force receiving body Y-axis connecting portion 41 is connected is disposed at a position closer to the force receiving body 10 than the position where the force receiving body X-axis connecting portion 42 is connected. Accordingly, the dimension (P2$x$) of the force receiving body X-axis connecting portion 42 in the X-axis direction can be greater than the dimension (P1$y$) of the force receiving body Y-axis connecting portion 41 in the Y-axis direction. Moreover, the position of the strain body 30 where the support body X-axis connecting portion 51 is connected is disposed at a position closer to the support body 20 than the position where the support body Y-axis connecting portion 52 is connected. Accordingly, the dimension (Q2$y$) of the support body Y-axis connecting portion 52 in the Y-axis direction can be greater than the dimension (Q1$x$) of the support body X-axis connecting portion 51 in the X-axis direction.

As described above, the dimension (P2$x$) of the force receiving body X-axis connecting portion 42 in the X-axis direction is greater than the dimension (P1$y$) of the force receiving body Y-axis connecting portion 41 in the Y-axis direction. Accordingly, when moment Ma about the Z-axis acts, the force receiving body X-axis connecting portion 42 becomes smaller in spring constant than the force receiving body Y-axis connecting portion 41, and becomes easier to elastically deform. The force receiving body Y-axis connecting portion 41 becomes greater in spring constant, and substantially functions as a rigid body. Moreover, the dimension (Q2y) of the support body Y-axis connecting portion 52 in the Y-axis direction is greater than the dimension (Q1x) of the support body X-axis connecting portion 51 in the X-axis direction. Accordingly, when moment Mz about the 2-axis acts, the support body Y-axis connecting portion 52 becomes smaller in spring constant than the support body X-axis connecting portion 51, and becomes easier to elastically deform. The support body X-axis connecting portion 51 becomes greater in spring constant, and substantially functions as a rigid body.

When the moment Mz about the Z-axis acts, tensile force or compressive force as illustrated in FIG. 8 can be applied to each of the deformable bodies 31a to 31d of the strain body 30 disposed in the first to fourth quadrants. Thus, a displacement portion 35 of each of the deformable bodies 31a to 31d can be displaced in the Z-axis direction, and a displacement electrode 62 and a fixed electrode 63 constituting each of capacitive elements 61a to 61d can be disposed so as to face in the Z-axis direction. In this case, the facing surfaces of the displacement electrode 62 and the fixed electrode 63 can be disposed along the XY plane, and the alignment of the displacement electrode 62 and the fixed electrode 63 can be facilitated. As a result, the efficiency of manufacturing the torque sensor 1 can be improved.

In this way, according to the present embodiment, the dimension (P2x) of the force receiving body X-axis connecting portion 42 in the X-axis direction is greater than the dimension (P1y) of the force receiving body Y-axis connecting portion 41 in the Y-axis direction, and the dimension (Q2y) of the support body Y-axis connecting portion 52 in the Y-axis direction is greater than the dimension (Q1x) of the support body X-axis connecting portion 51 in the X-axis direction. This allows the force receiving body Y-axis connecting portion 41 and the support body X-axis connecting portion 51 to substantially function as rigid bodies when moment Mz about the Z-axis acts, and the force receiving body X-axis connecting portion 42 and the support body Y-axis connecting portion 52 can be easily elastically deformed. Thus, tensile force or compressive force can be easily applied to each of the deformable bodies 31a to 31d of the strain body 30 disposed in the first to fourth quadrants. As a result, each of the displacement portions 35 of each of the deformable bodies 31a to 31d can be easily displaced in the Z-axis direction, and a change in the capacitance value of each of the capacitive elements 61a to 61d can be easily detected.

Moreover, according to the present embodiment, the strain body 30 may be formed into an elliptical ring shape so as to have a long axis along the Y-axis and a short axis along the X-axis, when seen along the Z-axis. Accordingly, the deformable bodies 31a to 31d can be connected to each other. Thus, even if force or moment other than the moment Mz about the Z-axis acts, the elastic deformation of each of the deformable bodies 31a to 31d of the strain body 30 can be restrained. As a result, even if force or moment other than the moment Mz acts, the capacitance value of each of the capacitive elements 61a to 61d can be restrained from changing, and the detection of force or moment other than the moment Mz can be restrained. Moreover, the strain body 30 is formed into an elliptical ring shape as described above, whereby the dimension (P2x) of the force receiving body X-axis connecting portion 42 in the X-axis direction can be greater than the dimension (P1y) of the force receiving body Y-axis connecting portion 41 in the Y-axis direction, and the dimension (Q2y) of the support body Y-axis connecting portion 52 in the Y-axis direction can be greater than the dimension (Q1x) of the support body X-axis connecting portion 51 in the X-axis direction.

In addition, in the present embodiment described above, an example has been described in which the strain body 30 is formed into an elliptical ring shape so as to have a long axis along the Y-axis and a short axis along the X-axis, when seen along the Z-axis. However, the present invention is not limited thereto.

For example, as illustrated in FIG. 16, the strain body 30 may be formed into a circular ring shape, and formed concentrically with the force receiving body 10 and the support body 20, when seen along the Z-axis. FIG. 16 is a plan view illustrating a modification of the torque sensor in FIG. 15.

In this case, a base portion 85 may be interposed between the force receiving body Y-axis connecting portion 41 and the strain body 30. The base portion 85 may be formed so as to have a large spring constant in response to force or moment acting on the force receiving body 10, and to substantially function as a rigid body. The force receiving body X-axis connecting portion 42 may be directly connected to the strain body 30. Accordingly, the dimension (P2x) of the force receiving body X-axis connecting portion 42 in the X-axis direction can be greater than the dimension (P1y) of the force receiving body Y-axis connecting portion 41 in the Y-axis direction. The base portion 85 may be interposed not between the force receiving body Y-axis connecting portion 41 and the strain body 30 but between the force receiving body 10 and the force receiving body Y-axis connecting portion 41. Alternatively, the base portion 85 may be interposed both between the force receiving body 10 and the force receiving body Y-axis connecting portion 41 and between the force receiving body Y-axis connecting portion 41 and the strain body 30.

Similarly, a base portion 86 similar to the base portion 85 described above may be interposed between the strain body 30 and the support body X-axis connecting portion 51. The base portion 86 may be interposed not between the strain body 30 and the support body X-axis connecting portion 51 but between the support body X-axis connecting portion 51 and the support body 20. Alternatively, the base portion 86 may be interposed both between the strain body 30 and the support body X-axis connecting portion 51 and between the support body X-axis connecting portion 51 and the support body 20.

Third Embodiment

Figure 17:
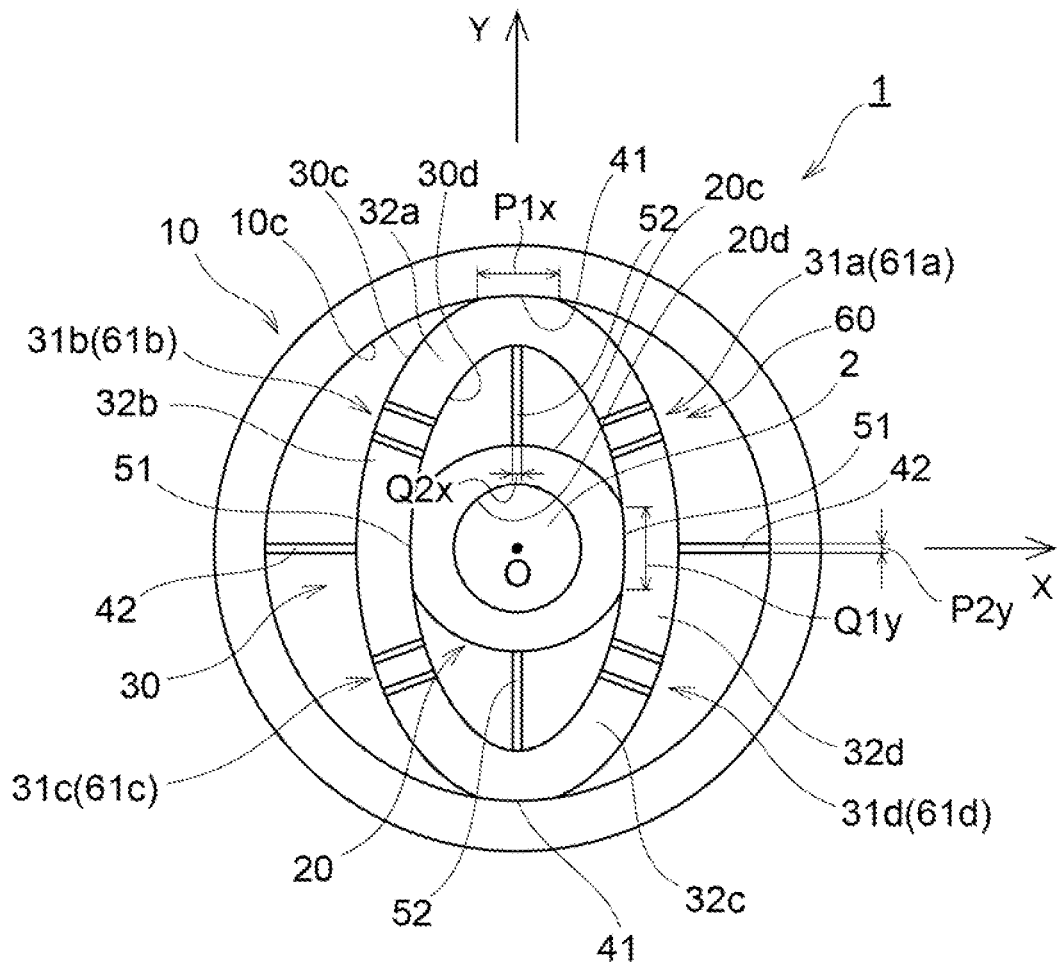
FIG. 17 is a plan view illustrating a torque sensor according to a third embodiment.
Figure 18:
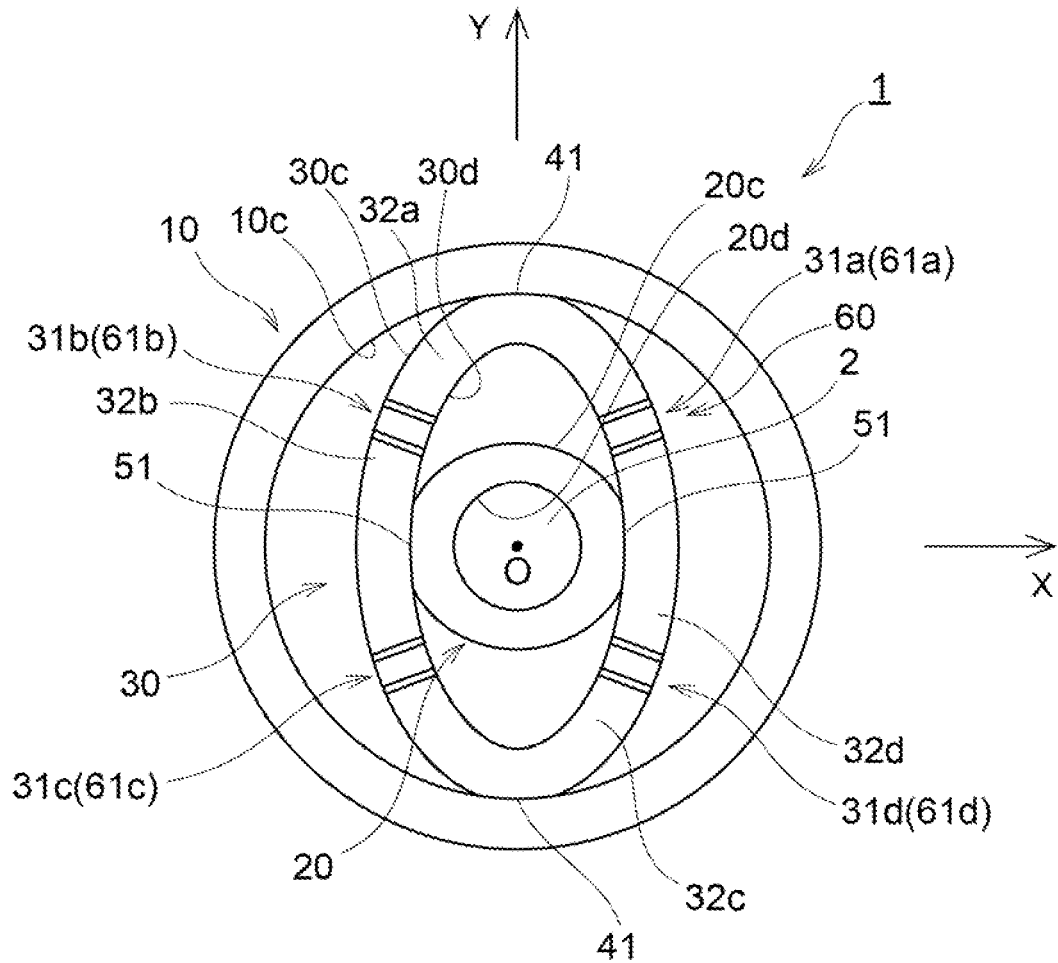
FIG. 18 is a plan view illustrating a modification of the torque sensor in FIG. 17.

Next, a torque sensor according to a third embodiment of the present invention is described by use of FIGS. 17 and 18.

The third embodiment illustrated in FIGS. 17 and 18 is mainly different from the first embodiment illustrated in FIGS. 1 to 14 in that a force receiving body Y-axis connecting portion 41 is formed at a connection position between a force receiving body 10 and a strain body 30, and a support body X-axis connecting portion 51 is formed at a connection position between the strain body 30 and a support body 20. In other respects, the configuration according to the third embodiment is substantially the same as that according to the first embodiment. In addition, in FIGS. 17 and 18, the same reference signs are assigned to the same parts as those according to the first embodiment illustrated in FIGS. 1 to 14, and the detailed description of these parts is omitted.

A torque sensor 1 according to the present embodiment is described with reference to FIG. 17. FIG. 17 is a plan view illustrating the torque sensor according to the third embodiment.

As illustrated in FIG. 17, in the torque sensor 1 according to the present embodiment, the force receiving body Y-axis connecting portion 41 is formed at a connection position between the force receiving body 10 and the strain body 30. An outer peripheral surface 30c of the strain body 30 may be formed into an elliptical shape so as to have a long axis along the Y-axis and a short axis along the X-axis, when seen along the Z-axis. An inner peripheral surface 30d of the strain body 30 may be formed into an elliptical shape so as to have a long axis along the Y-axis and a short axis along the X-axis, when seen along the Z-axis. Although the width of the strain body 30 is circumferentially constant in the example illustrated in FIG. 17, the present invention is not limited thereto. As long as the detection of force or moment other than moment Mz can be restrained, the width of the strain body 30 does not need to be constant. Moreover, although the width of the strain body 30 illustrated in FIG. 17 is greater than the strain body 30 illustrated in FIG. 15 and others for convenience, the width of the strain body 30 may be any width as long as the above-described force receiving body Y-axis connecting portion 41 according to the present embodiment and the support body X-axis connecting portion 51 described later can be formed. The force receiving body 10 and the strain body 30 are connected by a force receiving body X-axis connecting portion 42.

A first strain body connecting portion 32a of the strain body 30 is connected to an inner peripheral surface 10c of the force receiving body 10. The dimension (P2y) of the force receiving body X-axis connecting portion 42 in the Y-axis direction is smaller than the dimension (P1x) of the force receiving body Y-axis connecting portion 41 in the X-axis direction. Accordingly, the force receiving body Y-axis connecting portion 41 becomes greater in spring constant in response to the moment Mz about the Z-axis, and substantially functions as a rigid body. It is easier for the force receiving body X-axis connecting portion 42 to elastically deform in response to the moment M about the Z-axis.

The support body X-axis connecting portion 5 is formed at a connection position between the strain body 30 and the support body 20. An outer peripheral surface 20c of the support body 20 may be formed into an elliptical shape so as to have a long axis along the X-axis and a short axis along the Y-axis, when seen along the Z-axis. An inner peripheral surface 20d of the support body 20 may be formed into a circular shape when seen along the Z-axis. This inner peripheral surface 20d defines a sensor opening 2. In FIG. 17, the circular sensor opening 2 of the torque sensor 1 is formed inside the support body 20. The strain body 30 and the support body 20 are connected by a support body Y-axis connecting portion 52.

The support body 20 is connected to the inner peripheral surface 30d of the strain body 30 (a second strain body connecting portion 32b and a fourth strain body connecting portion 32d). The dimension (Q2x) of the support body Y-axis connecting portion 52 in the X-axis direction is smaller than the dimension (Q1y) of the support body X-axis connecting portion 51 in the Y-axis direction. Accordingly, the support body X-axis connecting portion 51 becomes greater in spring constant in response to the moment Mz about the Z-axis, and substantially functions as a rigid body.

It is easier for the support body Y-axis connecting portion 52 to elastically deform in response to the moment Mz about the Z-axis.

When the moment Mz about the Z-axis acts, tensile force or compressive force as illustrated in FIG. 8 can be applied to each of the deformable bodies 31a to 31d of the strain body 30 disposed in the first to fourth quadrants. Thus, a displacement portion 35 of each of the deformable bodies 31a to 31d can be displaced in the Z-axis direction, and a displacement electrode 62 and a fixed electrode 63 constituting each of capacitive elements 61a to 61d can be disposed so as to face in the Z-axis direction. In this case, the facing surfaces of the displacement electrode 62 and the fixed electrode 63 can be disposed along the XY plane, and the alignment of the displacement electrode 62 and the fixed electrode 63 can be facilitated. As a result, the efficiency of manufacturing the torque sensor 1 can be improved.

In this way, according to the present embodiment, the force receiving body Y-axis connecting portion 41 is formed at a connection position between the force receiving body 10 and the strain body 30, and the support body X-axis connecting portion 51 is formed at a connection position between the strain body 30 and the support body 20. This allows the force receiving body Y-axis connecting portion 41 and the support body X-axis connecting portion 51 to substantially function as rigid bodies when moment Mx about the Z-axis acts, and the force receiving body X-axis connecting portion 42 and the support body Y-axis connecting portion 52 can be easily elastically deformed. Thus, tensile force or compressive force can be easily applied to each of the deformable bodies 31a to 31d of the strain body 30 disposed in the first to fourth quadrants. As a result, each of the displacement portions 35 of each of the deformable bodies 31a to 31d can be easily displaced in the Z-axis direction, and a change in the capacitance value of each of the capacitive elements 61a to 61d can be easily detected.

Moreover, according to the present embodiment, the outer peripheral surface 30c of the strain body 30 is formed into an elliptical shape so as to have a long axis along the Y-axis and a short axis along the X-axis, when seen along the Z-axis. Accordingly, the strain body 30 can be connected to the inner peripheral surface 10c of the force receiving body 10, and the force receiving body Y-axis connecting portion 41 can be formed at a connection position between the force receiving body 10 and the strain body 30. This allows the force receiving body Y-axis connecting portion 41 to substantially function as a rigid body in response to the moment Mz about the Z-axis.

Moreover, according to the present embodiment, the outer peripheral surface 20c of the support body 20 may be formed into an elliptical shape so as to have a long axis along the X-axis and a short axis along the Y-axis, when seen along the Z-axis. Accordingly, the support body 20 can be connected to the inner peripheral surface 30d of the strain body 30, and the support body X-axis connecting portion 51 can be formed at a connection position between the strain body 30 and the support body 20. This allows the support body X-axis connecting portion 51 to substantially function as a rigid body in response to the moment Mz about the Z-axis.

Moreover, according to the present embodiment, the dimension (P2y) of the force receiving body X-axis connecting portion 42 in the Y-axis direction is smaller than the dimension (P1x) of the force receiving body Y-axis connecting portion 41 in the X-axis direction, and the dimension (Q2x) of the support body Y-axis connecting portion 52 in the X-axis direction is smaller than the dimension (Q1y) of the support body X-axis connecting portion 51 in the Y-axis direction. This allows the force receiving body Y-axis connecting portion 41 and the support body X-axis connecting portion 51 to substantially function as rigid bodies when moment Ma about the Z-axis acts, and the force receiving body X-axis connecting portion 42 and the support body Y-axis connecting portion 52 can be easily elastically deformed. Thus, tensile force or compressive force can be easily applied to each of the deformable bodies 31a to 31d of the strain body 30 disposed in the first to fourth quadrants. As a result, each of the displacement portions 35 of each of the deformable bodies 31a to 31d can be easily displaced in the Z-axis direction, and a change in the capacitance value of each of the capacitive elements 61a to 61d can be easily detected.

In addition, in the above-described present embodiment, an example has been described in which the outer peripheral surface 20c of the support body 20 is formed into an elliptical shape so as to have a long axis along the X-axis and a short axis along the Y-axis, when seen along the Z-axis. However, the present invention is not limited thereto. For example, as illustrated in FIG. 2 and others, the outer peripheral surface 20c of the support body 20 may be formed into a circular shape. Moreover, the inner peripheral surface 20d of the support body 20 may be formed into an elliptical shape so as to have a long axis along the X-axis and a short axis along the Y-axis, when seen along the Z-axis.

Moreover, in the present embodiment described above, an example has been described n which the force receiving body 10 and the strain body 30 are connected by the force receiving body X-axis connecting portion 42, and the strain body 30 and the support body 20 are connected by the support body Y-axis connecting portion 52. However, the present invention is not limited thereto.

For example, as illustrated in FIG. 18, the strain body 30 and the support body 20 do not need to be connected at the position of the strain body 30 where the force receiving body Y-axis connecting portion 41 is connected. That is to say, the first strain body connecting portion 32a and a third strain body connecting portion 32c do not need to be connected to the support body 20 by the support body Y-axis connecting portion 52 as illustrated in FIG. 17. Moreover, the force receiving body 10 and the strain body 30 do not need to be connected at the position of the strain body 30 where the support body X-axis connecting portion 51 is connected. That is to say, the second strain body connecting portion 32b and the fourth strain body connecting portion 32d do not need to be connected to the force receiving body 10 by the force receiving body X-axis connecting portion 42 as illustrated in FIG. 17. FIG. 18 is a plan view illustrating a modification of the torque sensor in FIG. 17.

In the torque sensor illustrated in FIG. 18 as well, the force receiving body 10 and the strain body 30 are connected by the force receiving body Y-axis connecting portion 41, and the strain body 30 and the support body 20 are connected by the support body X-axis connecting portion 51. Accordingly, when the moment Mz about the Z-axis acts, tensile force or compressive force can be applied to each of the deformable bodies 31a to 31d of the strain body 30 disposed in the first to fourth quadrants. Thus, the displacement portion 35 of each of the deformable bodies 31a to 31d can be displaced in the Z-axis direction, and the displacement electrode 62 and the fixed electrode 63 constituting each of the capacitive elements 61a to 61d can be disposed so as to face in the Z-axis direction. In this case, the facing surfaces of the displacement electrode 62 and the fixed electrode 63 can be disposed along the XY plane, and the alignment of the displacement electrode 62 and the fixed electrode 63 can be facilitated. As a result, the efficiency of manufacturing the torque sensor 1 can be improved.

In this way, according to the modification illustrated in FIG. 18, the strain body 30 and the support body 20 are not connected at the position of the strain body 30 where the force receiving body Y-axis connecting portion 41 is connected, and the force receiving body 10 and the strain body 30 are not connected at the position of the strain body 30 where the support body X-axis connecting portion 51 is connected.

Accordingly, while the efficiency of manufacturing the torque sensor 1 is improved, the structure of the torque sensor 1 can be simplified, and price lowering can be achieved.

Fourth Embodiment

Next, a torque sensor according to a fourth embodiment of the present invention is described by use of FIGS. 19 to 22.

The fourth embodiment illustrated in FIGS. 19 to 22 is mainly different from the first embodiment illustrated in FIGS. 1 to 14 in that a strain body 30 is disposed on the negative side of the Z-axis relative to a force receiving body 10, and a support body 20 is disposed on the negative side of the Z-axis relative to the strain body 30. In other respects, the configuration according to the fourth embodiment is substantially the same as that according to the first embodiment. In addition in FIGS. 19 to 22, the same reference signs are assigned to the same parts as those according to the first embodiment illustrated in FIGS. 1 to 14, and the detailed description of these parts is omitted.

Figure 19:
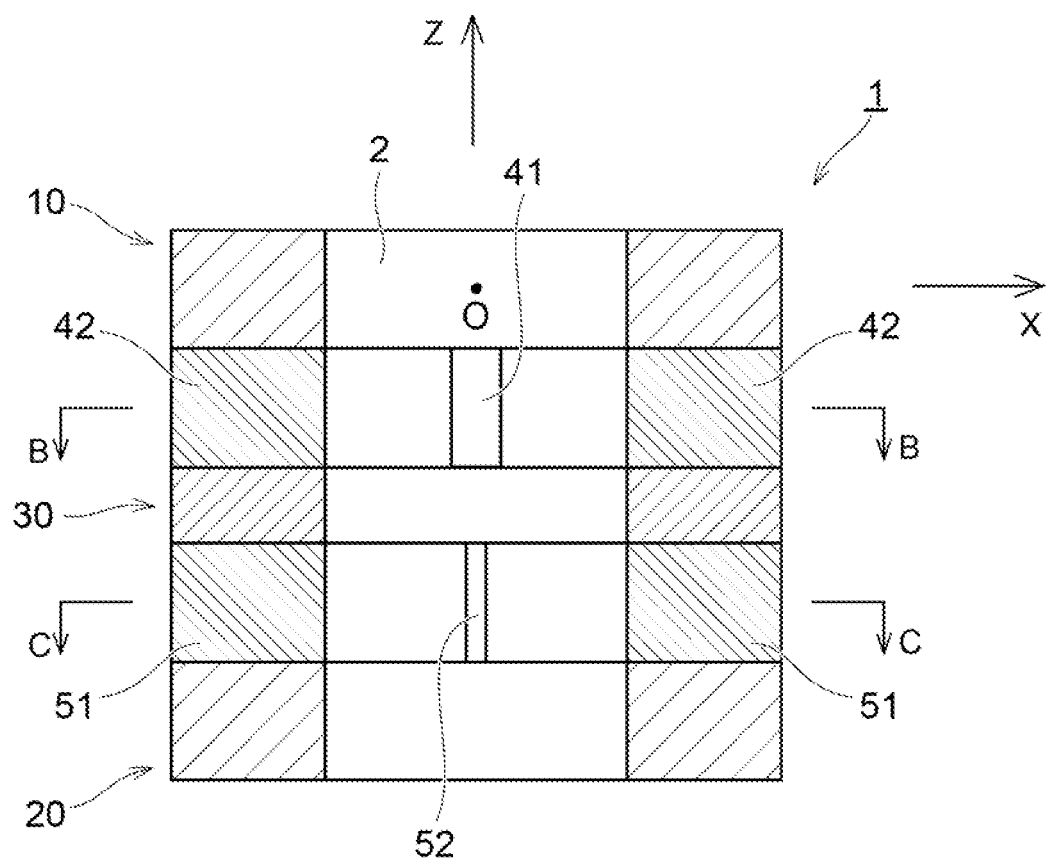
FIG. 19 is a sectional view illustrating a torque sensor according to a fourth embodiment.
Figure 20:
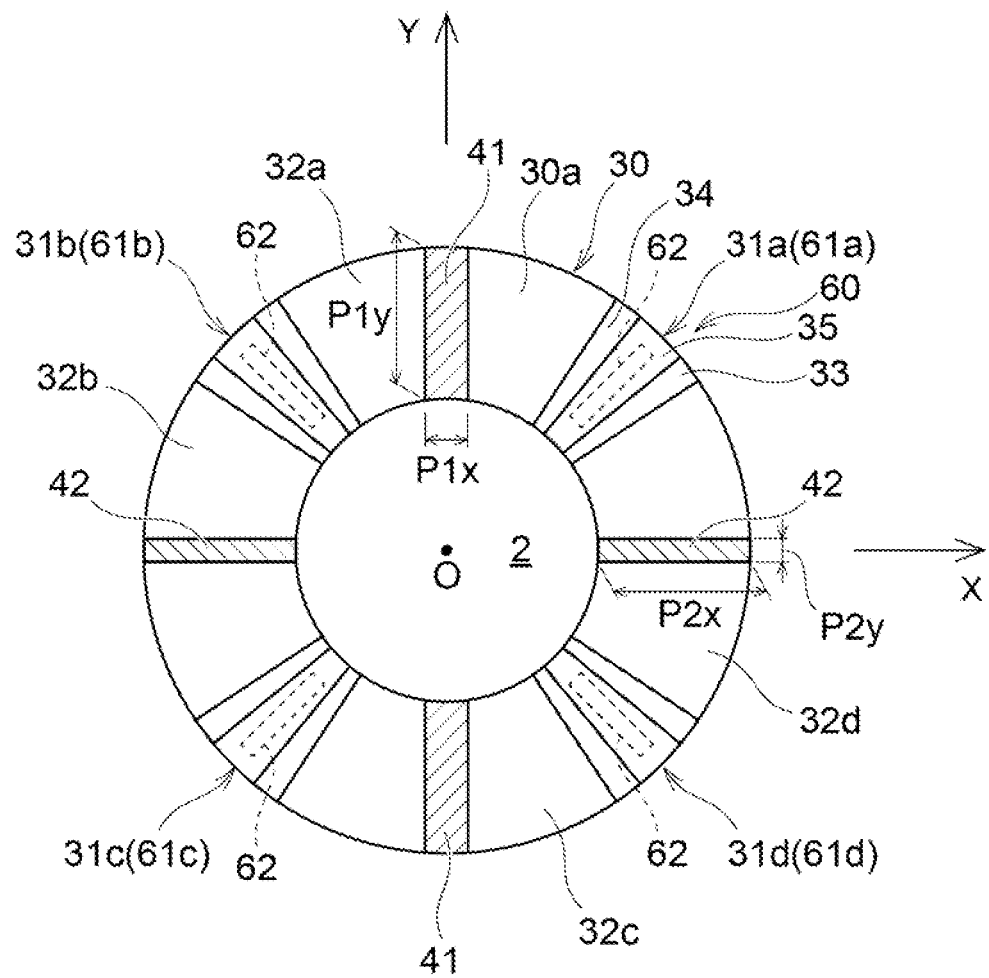
FIG. 20 is a sectional view along the line B-B in FIG. 19.
Figure 21:
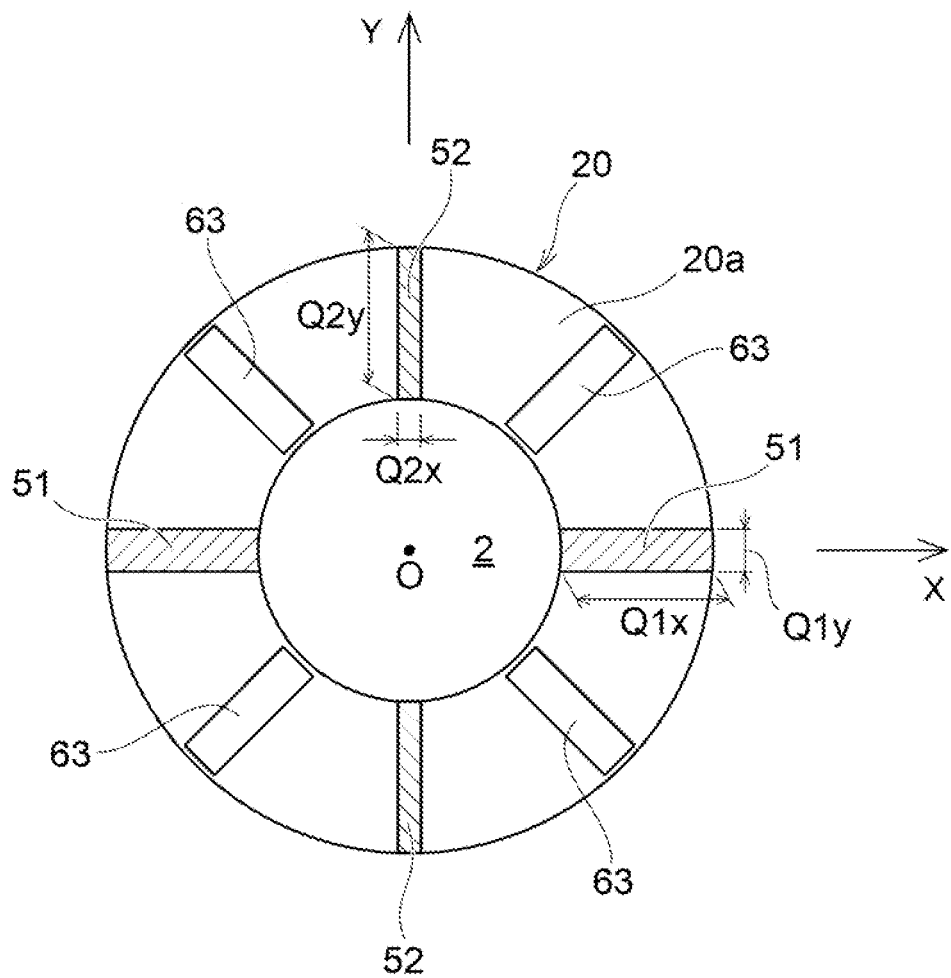
FIG. 21 is a sectional view along the line C-C in FIG. 19.

A torque sensor 1 according to the present embodiment is described with reference to FIGS. 19 to 21. FIG. 19 is a sectional view illustrating the torque sensor according to the fourth embodiment. FIG. 20 is a sectional view along the line B-B in FIG. 19. FIG. 21 is a sectional view along the line C-C in FIG. 19.

As illustrated in FIG. 19, in the torque sensor 1 according to the present embodiment, the strain body 30 is disposed on the negative side of the Z-axis relative to the force receiving body 10, and the support body 20 is disposed on the negative side of the Z-axis relative to the strain body 30. That is to say, the force receiving body 10, the strain body 30, and a support body 20 are stacked in the Z-axis direction. The force receiving body 10, the strain body 30, and a support body 20 may be each formed into a circular ring shape, or formed concentrically with one another, when seen along the Z-axis. As illustrated in FIGS. 20 and 21, a sensor opening 2 of the torque sensor 1 is formed inside the force receiving body 10, inside the strain body 30, and inside the support body 20.

As illustrated in FIG. 19, a force receiving body Y-axis connecting portion 41 according to the present embodiment is disposed between the force receiving body 10 and the strain body 30 in the Z-axis direction. As illustrated in FIG. 20, the force receiving body Y-axis connecting portion 41 overlaps the force receiving body 10 and the strain body 30, when seen along the Z-axis. The force receiving body Y-axis connecting portion 41 extends along the Y-axis, and extends along the Z-axis. In the present embodiment, the force receiving body Y-axis connecting portion 41 is formed into a rectangular shape along the X-axis, the Y-axis, and the Z-axis. The dimension of the force receiving body Y-axis connecting portion 41 in the Z-axis direction may be greater than the dimension (P1y) of the force receiving body Y-axis connecting portion 41 in the Y-axis direction, but does not need to be greater.

As illustrated in FIG. 19, a force receiving body X-axis connecting portion 42 according to the present embodiment is disposed between the force receiving body 10 and the strain body 30 in the Z-axis direction. As illustrated in FIG. 20, the force receiving body X-axis connecting portion 42 overlaps the force receiving body 10 and the strain body 30, when seen along the Z-axis. The force receiving body X-axis connecting portion 42 extends along the X-axis, and extends along the Z-axis. In the present embodiment, the force receiving body X-axis connecting portion 42 is formed into a rectangular shape along the X-axis, the Y-axis, and the Z-axis. The dimension of the force receiving body X-axis connecting portion 42 in the Z-axis direction may be greater than the dimension (P2x) of the force receiving body X-axis connecting portion 42 in the X-axis direction, but does not need to be greater.

In the present embodiment, a displacement portion 35 of each of deformable bodies 31a to 31d of a strain body 30 may face an upper surface 20a of the support body 20. In this case, a fixed electrode 63 constituting each of capacitive elements 61a to 61d may be provided on the upper surface 20a of the support body 20. However, the present invention is not limited thereto, and the displacement portion 35 may face a lower surface 10b of the force receiving body 10. In this case, the fixed electrode 63 may be provided on the lower surface 10b of the force receiving body 10.

As illustrated in FIG. 20, in the present embodiment, the dimension (P2y) of the force receiving body X-axis connecting portion 42 in the Y-axis direction is smaller than the dimension (P1x) of the force receiving body Y-axis connecting portion 41 in the X-axis direction.

As illustrated in FIG. 19, a support body X-axis connecting portion 51 according to the present embodiment is disposed between the strain body 30 and the support body 20 in the Z-axis direction. As illustrated in FIG. 21 the support body X-axis connecting portion 51 overlaps the strain body 30 and the support body 20, when seen along the Z-axis. The support body X-axis connecting portion 51 extends along the X-axis, and extends along the Z-axis. In the present embodiment, the support body X-axis connecting portion 51 is formed into a rectangular shape along the X-axis, the Y-axis, and the Z-axis. The dimension of the support body X-axis connecting portion 51 in the Z-axis direction may be greater than the dimension (Q1x) of the support body X-axis connecting portion 51 in the X-axis direction, but does not need to be greater.

As illustrated in FIG. 19, a support body Y-axis connecting portion 52 according to the present embodiment is disposed between the strain body 30 and the support body 20 in the Z-axis direction. As illustrated in FIG. 21, the support body Y-axis connecting portion 52 overlaps the strain body 30 and the support body 20, When seen along the Z-axis. The support body Y-axis connecting portion 52 extends along the Y-axis, and extends along the Z-axis. In the present embodiment, the support body Y-axis connecting portion 52 is formed into a rectangular shape along the X-axis, the Y-axis, and the Z-axis. The dimension of the support body Y-axis connecting portion 52 in the Z-axis direction may be greater than the dimension (Q2y) of the support body Y-axis connecting portion 52 in the Y-axis direction, but does not need to be greater.

As illustrated in FIG. 21, in the present embodiment, the dimension (Q2x) of the support body Y-axis connecting portion 52 in the X-axis direction is smaller than the dimension (Q1y) of the support body X-axis connecting portion 51 in the Y-axis direction.

When the moment Mz about the Z-axis acts, the force receiving body Y-axis connecting portion 41 substantially functions as a rigid body, and the force receiving body X-axis connecting portion 42 is elastically deformed. Moreover, the support body X-axis connecting portion 51 substantially functions as a rigid body, and the support body Y-axis connecting portion 52 is elastically deformed. Accordingly, tensile force or compressive force as illustrated in FIG. 8 can be applied to each of the deformable bodies 31a to 31d of the strain body 30 disposed in the first to fourth quadrants. Thus, the displacement portion 35 of each of the deformable bodies 31a to 31d can be displaced in the Z-axis direction, and the displacement electrode 62 and the fixed electrode 63 constituting each of the capacitive elements 61a to 61d can be disposed so as to face in the Z-axis direction. In this case, the facing surfaces of the displacement electrode 62 and the fixed electrode 63 can be disposed along the XY plane, and the alignment of the displacement electrode 62 and the fixed electrode 63 can be facilitated. As a result, the efficiency of manufacturing the torque sensor 1 can be improved.

In this way, according to the present embodiment, the support body 20 is disposed on the negative side of the Z-axis relative to the strain body 30. Accordingly, the sensor opening 2 of the torque sensor 1, can be enlarged. When the torque sensor 1 is applied to a robot, a cable and a tube used in the robot are often passed through the sensor opening 2 of the torque sensor 1. Thus, when the strain body 30 and the support body 20 are stacked in the Z-axis direction as in the present embodiment, the sensor opening 2 of the torque sensor 1 can be enlarged, and a cable and a tube can be easily passed through. Usability of the torque sensor 1 can be improved.

Moreover, according to the present embodiment, the strain body 30 is disposed on the negative side of the Z-axis relative to the force receiving body 10, Accordingly, the sensor opening 2 of the torque sensor 1 can be further enlarged. Thus, a cable and a tube used in the robot can be more easily passed through, and usability of the torque sensor 1 can be further improved.

Moreover, according to the present embodiment, the force receiving body X-axis connecting portion 42 and the support body X-axis connecting portion 51 each extend along the X-axis. Accordingly, even if the force Fy in the X-axis direction acts on the force receiving body 10, the force receiving body X-axis connecting portion 42 and the support body X-axis connecting portion 51 can substantially function as rigid bodies, and the elastic deformation of each of the deformable bodies 31a to 31d of the strain body 30 can be restrained. Thus, even if the force Fx in the X-axis direction acts, the capacitance value of each of the capacitive elements 61a to 61d can be restrained from changing, and the detection of the force Fx can be restrained.

Moreover, according to the present embodiment, the force receiving body Y-axis connecting portion 41 and the support body Y-axis connecting portion 52 each extend along the Y-axis. Accordingly, even if the force Fy in the Y-axis direction acts on the force receiving body 10, the force receiving body Y-axis connecting portion 41 and the support body Y-axis connecting portion 52 can substantially function as rigid bodies, and the elastic deformation of each of the deformable bodies 31a to 31d of the strain body 30 can be restrained. Thus, even if the force Fy in the Y-axis direction acts, the capacitance value of each of the capacitive elements 61a to 61d can be restrained from changing, and the detection of the force Fy can be restrained.

Moreover, according to the present embodiment, the force receiving body Y-axis connecting portion 41, the force receiving body X-axis connecting portion 42, the support body X-axis connecting portion 51, and the support body Y-axis connecting portion 52 each extend along the Z-axis. This allows each of the connecting portions 41, 42, 51, and 52 to substantially function as a rigid body in response to force in the Z-axis direction. Thus, even if the force Fz in the Z-axis direction acts on the force receiving body 10, the elastic deformation of the deformable bodies 31a to 31d of the strain body 30 can be restrained. Similarly, even if the moment Mx about the X-axis and the moment My about the Y-axis act on the force receiving body 10, the elastic deformation of each of the deformable bodies 31a to 31d of the strain body 30 can be restrained. Thus, even if the force Fz, the moment Mx, or the moment My acts, the capacitance value of each of the capacitive elements 61a to 61d can be restrained from changing, and the detection of the force Fz, the moment Mx, or the moment My can be restrained.

Moreover, according to the present embodiment, the dimension (P2y) of the force receiving body X-axis connecting portion 42 in the Y-axis direction is smaller than the dimension (P1x) of the force receiving body Y-axis connecting portion 41 in the X-axis direction, and the dimension (Q2x) of the support body Y-axis connecting portion 52 in the X-axis direction is smaller than the dimension (Q1y) of the support body X-axis connecting portion 51 in the Y-axis direction. This allows the force receiving body Y-axis connecting portion 41 and the support body X-axis connecting portion 51 to substantially function as rigid bodies when moment Mz about the Z-axis acts, and the force receiving body X-axis connecting portion 42 and the support body Y-axis connecting portion 52 can be easily elastically deformed. Thus, tensile force or compressive force can be easily applied to each of the deformable bodies 31a to 31d of the strain body 30 disposed in the first to fourth quadrants. As a result, each of the displacement portions 35 of each of the deformable bodies 31a to 31d can be easily displaced in the Z-axis direction, and a change in the capacitance value of each of the capacitive elements 61a to 61d can be easily detected.

Moreover, according to the present embodiment, the strain body 30 is formed into a circular ring shape when seen along the Z-axis. Accordingly, the deformable bodies 31a to 31d can be connected to each other. Thus, even if force or moment other than the moment Mz about the Z-axis acts, the elastic deformation of each of the deformable bodies 31a to 31d of the strain body 30 can be restrained. As a result, even if force or moment other than the moment Mz acts, the capacitance value of each of the capacitive elements 61a to 61d can be restrained from changing, and the detection of force or moment other than the moment Mz can be restrained.

Figure 22:
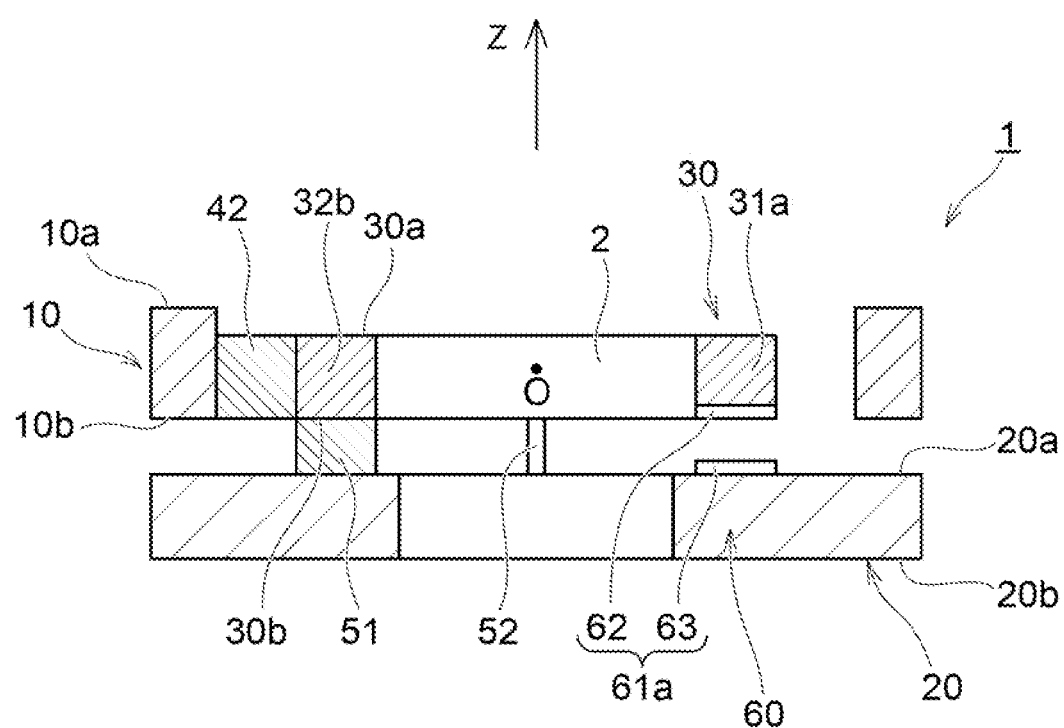
FIG. 22 is a sectional view illustrating a modification of the torque sensor in FIG. 19.

In addition, in the present embodiment described above, an example has been described in which the strain body 30 is disposed on the negative side of the Z-axis relative to the force receiving body 10, and the support body 20 is disposed on the negative side of the Z-axis relative to the strain body 30. However, the present invention is not limited thereto. For example, as illustrated in FIG. 22 the force receiving body 10 and the strain body 30 may be disposed along the ICY plane, and the support body 20 may be disposed on the negative side of the Z-axis relative to the strain body 30. In this case as well, similar advantageous effects to the torque sensor 1 illustrated in FIG. 19 can be exerted, and the height dimension of the torque sensor 1 can be reduced. Moreover, in this case, the fixed electrode 63 of the detection element 60 may be mounted on the upper surface 20a of the support body 20. FIG. 22 is a sectional view illustrating a modification of the torque sensor in FIG. 19, and is a view equivalent to the section along the line A-A in FIG. 2.

The present invention is not limited to the embodiments and modifications described above, and can be embodied by modifying the components without departing from the spirit thereof at the stage of implementation. Moreover, various inventions can be formed by a suitable combination of a plurality of components disclosed in the embodiments and modifications described above. Some components may be deleted from all of the components disclosed in the embodiments and modifications described above. Further, the components in different embodiments and modifications may be suitably combined.

What is claimed is:

1. A torque sensor that detects moment about a Z-axis in an XYZ three-dimensional coordinate system, comprising:
   a first structure formed around the Z-axis;
   a second structure formed around the Z-axis;
   a strain body provided between the first structure and the second structure, the strain body connecting the first structure and the second structure, and producing elastic deformation by the action of the moment;
   two first structure Y-axis connecting portions that connect the first structure and the strain body;
   two second structure X-axis connecting portions that connect the strain body and the second structure;
   a detection element;
   a detection circuit that outputs an electric signal indicating the moment, based on a detection result of the detection element;
   two first structure X-axis connecting portions that connect the first structure and the strain body; and
   two second structure Y-axis connecting portions that connect the strain body and the second structure, wherein
   the first structure Y-axis connecting portions are disposed on a positive side and a negative side of a Y-axis relative to the strain body,
   the second structure X-axis connecting portions are disposed on a positive side and a negative side of an X-axis relative to the second structure,
   the strain body includes four deformable bodies each including a displacement portion that is displaced in a Z-axis direction by elastic deformation,
   the deformable bodies are respectively disposed in a first quadrant, a second quadrant, a third quadrant, and a fourth quadrant,
   the detection element includes a capacitive element that detects a change in capacitance value by a displacement of the displacement portion of each of the deformable bodies in the Z-axis direction,
   the second structure is disposed inside the first structure when seen along the Z-axis,
   the first structure Y-axis connecting portion extends along the Y-axis and the Z-axis,
   the dimension of the first structure Y-axis connecting portion in the Z-axis direction is greater than the dimension of the first structure Y-axis connecting portion in the Y-axis direction,
   the second structure X-axis connecting portion extends along the X-axis and the Z-axis,
   the dimension of the second structure X-axis connecting portion in the Z-axis direction is greater than the dimension of the second structure X-axis connecting portion in the X-axis direction, when seen along the Z-axis, the first structure X-axis connecting portions are disposed on a positive side and a negative side of the X-axis relative to the strain body, and the second structure Y-axis connecting portions are disposed on a positive side and a negative side of the Y-axis relative to the second structure, the first structure X-axis connecting portion extends along the X-axis, and the second structure Y-axis connecting portion extends along the Y-axis.

2. The torque sensor according to claim 1, wherein the first structure X-axis connecting portion and the second structure Y-axis connecting portion extend along the Z-axis, the dimension of the first structure X-axis connecting portion in the Z-axis direction is greater than the dimension of the first structure X-axis connecting portion in the X-axis direction, and the dimension of the second structure Y-axis connecting portion in the Z-axis direction is greater than the dimension of the second structure Y-axis connecting portion in the Y-axis direction.

3. The torque sensor according to claim 1, wherein the dimension of the first structure X-axis connecting portion in the Y-axis direction is smaller than the dimension of the first structure Y-axis connecting portion in the X-axis direction, and the dimension of the second structure Y-axis connecting portion in the X-axis direction is smaller than the dimension of the second structure X-axis connecting portion in the Y-axis direction.

4. The torque sensor according to claim 1, wherein the strain body is formed into a circular ring shape when seen along the Z-axis.

5. The torque sensor according to claim 1, wherein the dimension of the first structure X-axis connecting portion in the X-axis direction is greater than the dimension of the first structure Y-axis connecting portion in the Y-axis direction, and the dimension of the second structure Y-axis connecting portion in the Y-axis direction is greater than the dimension of the second structure X-axis connecting portion in the X-axis direction.

6. The torque sensor according to claim 5, wherein the strain body is formed into an elliptical ring shape so as to have a long axis along the Y-axis and a short axis along the X-axis, when seen along the Z-axis.

7. A torque sensor that detects moment about a Z-axis in an XYZ three-dimensional coordinate system, comprising:
a first structure formed around the Z-axis;
a second structure formed around the Z-axis;
a strain body provided between the first structure and the second structure, the strain body connecting the first structure and the second structure, and producing elastic deformation by the action of the moment;
two first structure Y-axis connecting portions that connect the first structure and the strain body;
two second structure X-axis connecting portions that connect the strain body and the second structure;
a detection element;
a detection circuit that outputs an electric signal indicating the moment, based on a detection result of the detection element;
two first structure X-axis connecting portions that connect the first structure and the strain body; and
two second structure Y-axis connecting portions that connect the strain body and the second structure, the first structure Y-axis connecting portions are disposed on a positive side and a negative side of a Y-axis relative to the strain body, the second structure X-axis connecting portions are disposed on a positive side and a negative side of an X-axis relative to the second structure, the strain body includes four deformable bodies each including a displacement portion that is displaced in a Z-axis direction by elastic deformation, the deformable bodies are respectively disposed in a first quadrant, a second quadrant, a third quadrant, and a fourth quadrant, the detection element includes a capacitive element that detects a change in capacitance value by a displacement of the displacement portion of each of the deformable bodies in the Z-axis direction, the second structure is disposed inside the first structure when seen along the Z-axis, the first structure Y-axis connecting portion is formed at a connection position between the first structure and the strain body, and the second structure X-axis connecting portion is formed at a connection position between the strain body and the second structure when seen along the Z-axis, the first structure X-axis connecting portions are disposed on a positive side and a negative side of the X-axis relative to the strain body, and the second structure Y-axis connecting portions are disposed on a positive side and a negative side of the Y-axis relative to the second structure, the first structure X-axis connecting portion extends along the X-axis, and the second structure Y-axis connecting portion extends along the Y-axis.

8. The torque sensor according to claim 7, wherein the outer peripheral surface of the strain body is formed into an elliptical shape so as to have a long axis along the Y-axis and a short axis along the X-axis, when seen along the Z-axis.

9. The torque sensor according to claim 7, wherein the outer peripheral surface of the second structure is formed into an elliptical shape so as to have a long axis along the X-axis and a short axis along the Y-axis, when seen along the Z-axis.

10. The torque sensor according to claim 7, wherein the dimension of the first structure X-axis connecting portion in the Y-axis direction is smaller than the dimension of the first structure Y-axis connecting portion in the X-axis direction, and the dimension of the second structure Y-axis connecting portion in the X-axis direction is smaller than the dimension of the second structure X-axis connecting portion in the Y-axis direction.

* * * * *